United States Patent
Zhong et al.

(10) Patent No.: US 9,846,927 B2
(45) Date of Patent: Dec. 19, 2017

(54) SYSTEMS AND METHODS FOR HAZINESS DETECTION

(71) Applicant: QUALCOMM Incorporated, San Diego, CA (US)

(72) Inventors: Xin Zhong, San Diego, CA (US); Yingyong Qi, San Diego, CA (US); Dashan Gao, San Diego, CA (US); Yang Yang, Irvine, CA (US); Kuen-Han Lin, South San Francisco, CA (US); Ning Bi, San Diego, CA (US); Feng Guo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 14/716,653

(22) Filed: May 19, 2015

(65) Prior Publication Data
US 2015/0339811 A1 Nov. 26, 2015

Related U.S. Application Data

(63) Continuation-in-part of application No. 14/619,354, filed on Feb. 11, 2015, now Pat. No. 9,734,425.
(Continued)

(51) Int. Cl.
*G06K 9/00* (2006.01)
*G06T 7/00* (2017.01)
*G06K 9/62* (2006.01)

(52) U.S. Cl.
CPC ........ *G06T 7/0002* (2013.01); *G06K 9/00791* (2013.01); *G06K 9/6267* (2013.01);
(Continued)

(58) Field of Classification Search
CPC .... G06K 9/00791; G06K 9/6267; G06K 9/66; G06K 9/00744; G06K 9/00771;
(Continued)

(56) References Cited

U.S. PATENT DOCUMENTS 6,434,254 B1 * 8/2002 Wixson .............. G06K 9/00785
348/122
6,724,917 B1 * 4/2004 Ohashi ................... E21F 1/003
382/104

(Continued)

FOREIGN PATENT DOCUMENTS

DE 102007023037 A1 11/2007
WO 2013173911 A1 11/2013

OTHER PUBLICATIONS

Groszek M.L., et al., "Haze Removal for Image Enhancement", SPIE, PO Box 10 Bellingham WA 98227-0010, USA, vol. 5678, Jan. 16, 2005 (Jan. 16, 2005)-Jan. 20, 2005 (Jan. 20, 2005), pp. 254-265, XP040198673, chapter I and III.
(Continued)

*Primary Examiner* — Aklilu Woldemariam

(57) ABSTRACT

A method performed by an electronic device is described. The method includes determining a haziness confidence level based on multiple modalities. The method also includes determining whether to perform an action based on the haziness confidence level. The method may include performing the action, including performing haziness reduction based on the haziness confidence level.

26 Claims, 15 Drawing Sheets

Related U.S. Application Data

(60) Provisional application No. 62/000,856, filed on May 20, 2014.

(52) U.S. Cl.
CPC ...... *G06K 9/00* (2013.01); *G06T 2207/20076* (2013.01); *G06T 2207/30252* (2013.01)

(58) Field of Classification Search
CPC ...... G06K 9/0063; G06K 9/3241; G06K 9/40; G06K 9/6202; G06K 9/6255; G06K 9/00785; G06T 2207/20076; G06T 2207/30252; G06T 7/0002; G06T 2207/20081; G06T 7/408; G06T 7/0042; G06T 7/60; G06T 2207/20182; G06T 2207/30236; G06T 5/00; G06T 5/40; G06T 2207/30232; G08G 1/096716; B60T 8/172; G01N 21/84; H04L 63/1425; H04W 4/021; H04W 4/005; G06F 17/30598; H04B 17/391; G01S 5/0263; G01S 17/06; G01S 3/7864; B60W 2550/12; B60W 30/00; B60W 50/14; F41G 7/2226; G01W 1/00; A61B 17/320068; A61B 17/8819; A61B 18/02; A61B 18/18; A61B 2017/00867; A61B 2018/00791; A61B 2018/00821; A61B 2018/1807
USPC ............. 382/103, 104, 159, 167, 260, 274
See application file for complete search history.

(56) References Cited

U.S. PATENT DOCUMENTS

| | | | | |
|---|---|---|---|---|
| 7,602,942 | B2 * | 10/2009 | Bazakos | G06K 9/00255 209/577 |
| 8,786,697 | B2 * | 7/2014 | Kawasaki | G06K 9/00825 340/425.5 |
| 9,009,083 | B1 * | 4/2015 | Shetty | G06F 9/30145 706/12 |
| 9,514,373 | B2 * | 12/2016 | Jeromin | B60Q 1/143 |
| 2004/0204812 | A1 * | 10/2004 | Tran | B60T 8/172 701/80 |
| 2006/0177098 | A1 | 8/2006 | Stam | |
| 2007/0195680 | A1 * | 8/2007 | Brinson, Jr. | G06K 9/0063 369/124.02 |
| 2007/0244844 | A1 * | 10/2007 | Brinson | G06K 9/0063 706/46 |
| 2008/0044062 | A1 | 2/2008 | Stam et al. | |
| 2008/0061950 | A1 * | 3/2008 | Kawasaki | G06K 9/00798 340/425.5 |
| 2008/0273752 | A1 * | 11/2008 | Zhu | B60W 40/02 382/103 |
| 2010/0250106 | A1 * | 9/2010 | Bai | G08G 1/096716 701/117 |
| 2010/0259651 | A1 | 10/2010 | Fattal | |
| 2010/0322478 | A1 | 12/2010 | Nitanda | |
| 2011/0188775 | A1 | 8/2011 | Sun et al. | |
| 2013/0057687 | A1 | 3/2013 | Ehlgen et al. | |
| 2014/0072216 | A1 | 3/2014 | Fang et al. | |
| 2014/0117852 | A1 * | 5/2014 | Zhai | H05B 37/0245 315/86 |
| 2014/0233795 | A1 | 8/2014 | Omino | |
| 2014/0247968 | A1 * | 9/2014 | Pavlic | G06K 9/00791 382/104 |
| 2014/0333468 | A1 * | 11/2014 | Zhu | G01S 17/95 342/54 |
| 2015/0178953 | A1 * | 6/2015 | Gao | G06F 17/2765 345/681 |
| 2015/0336547 | A1 * | 11/2015 | Dagan | B60T 7/22 701/70 |
| 2016/0140725 | A1 * | 5/2016 | Bergner | G06T 5/002 382/173 |

OTHER PUBLICATIONS

Hautiere N., et al., "Combination of Roadside and In-vehicle Sensors for Extensive Visibility Range Monitoring", Advanced Video and Signal Based Surveillance, 2009. AVSS '09. Sixth IEEE International Conference on, IEEE, Piscataway, NJ, USA, Sep. 2, 2009 (Sep. 2, 2009), pp. 388-393.

International Search Report and Written Opinion—PCT/US2015/031790—ISA/EPO—dated Sep. 15, 2015.

Hautiere N., et al., "Detection of Visibility Conditions through Use of Onboard Cameras," Intelligent Vehicles Symposium, 2005, Proceedings, IEEE Las Vegas, NV, USA Jun. 6-8, 2005, Piscataway, NJ, USA, IEEE, Piscataway, NJ, USA, Jun. 6, 2005 (Jun. 6, 2005), pp. 193-198, XP010833966, DOI.

International Search Report and Written Opinion—PCT/US2016/014144—ISA/EPO—dated Apr. 13, 2016.

Fattal R, "Single Image Dehazing", ACM Transactions on Graphics, XP055191725, Aug. 1, 2008 (Aug. 1, 2008), vol. 27, No. 3, p. 9, ISSN: 0730-0301, DOI: 10.1145/1360612.1360671.

Narasimhan S.G., et al., "Contrast Restoration of Weather Degraded Images", IEEE Transactions on Pattern Analysis and Machine Intelligence, IEEE Computer Society, USA, XP001185045, Jun. 1, 2003 (Jun. 1, 2003), vol. 25, No. 6, pp. 713-724, ISSN: 0162-8828, DOI: 10.1109/TPAMI.2003.1201821.

Co-pending U.S. Appl. No. 14/619,354, filed Feb. 11, 2015.

Dong N., et al., "Adaptive Object Detection and Visibility Improvement in Foggy Image," Journal of Multimedia, Feb. 2011, vol. 6 (1), pp. 14-21.

Kopf J., et al., "Deep Photo: Model-Based Photograph Enhancement and Viewing," ACM Transactions on Graphics (Proceedings of SIGGRAPH Asia 2008), 2008, 10 pages.

Kponou E.A., et al., "A Comprehensive Study on Fast Image Dehazing Techniques," International Journal of Computer Science and Mobile Computing, Sep. 2013, vol. 2 (9), pp. 146-152.

Narasimhan S.G., "Models and Algorithms for Vision through the Atmosphere," 2003, pp. 1-205.

* cited by examiner

SYSTEMS AND METHODS FOR HAZINESS DETECTION

RELATED APPLICATIONS

This application is a continuation-in-part of U.S. patent application Ser. No. 14/619,354, filed Feb. 11, 2015, for "ENVIRONMENTAL SCENE CONDITION DETECTION," and claims priority to U.S. Provisional Patent Application Ser. No. 62/000,856 filed May 20, 2014, for "AUTOMATIC HAZY SCENE DETECTION AND DE-HAZING USING INFORMATION FROM MULTIPLE MODALITIES," all of which are assigned to the assignee hereof and hereby expressly incorporated by reference herein.

TECHNICAL FIELD

The present disclosure relates generally to electronic devices. More specifically, the present disclosure relates to systems and methods for haziness detection.

BACKGROUND

In the last several decades, the use of electronic devices has become more common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices (e.g., cameras, video camcorders, digital cameras, cellular phones, smart phones, computers, televisions, automobiles, personal cameras, action cameras, surveillance cameras, mounted cameras, connected cameras, robots, drones, smart applications, healthcare equipment, set-top boxes, etc.) capture and/or utilize images. For example, a digital camera may capture a digital image.

In some cases, captured images may suffer from degraded quality. For example, environmental scene conditions including atmospheric effects such as haze and glare can reduce image quality. As can be observed from this discussion, systems and methods that improve image usage may be beneficial.

SUMMARY

A method performed by an electronic device is described. The method includes determining a haziness confidence level based on multiple modalities. The method also includes determining whether to perform an action based on the haziness confidence level. The modalities may provide image modality information and location modality information, direction modality information, time of day modality information, local weather report modality information, remote device images modality information, an indoor/outdoor indicator, user override indicator, and/or temperature modality information.

The method may include performing the action. Performing the action may include performing haziness reduction based on the haziness confidence level. Performing haziness reduction may include adjusting an auto white balance, an auto focus, an auto exposure, a color, a sharpness, and/or a local tone mapping curve. Performing the action may include performing at least one non-image processing action.

Determining the haziness confidence level may be based on a two-stage classification. The two-stage classification may include performing a first feature extraction based on a camera input signal to produce a first set of one or more extracted features, performing a first classification based on the first set of extracted features and one or more of the modalities, and determining that the first classification indicates that haziness is detected. The two-stage classification may also include performing a second feature extraction based on the camera input signal and one or more of the modalities to produce a second set of one or more extracted features, and performing a second classification based on the second set of extracted features and one or more of the modalities.

The first set of extracted features may include a dark channel feature, a gradient of intensity feature, and/or a blurriness/sharpness feature. The second set of extracted features may include a dark channel feature, a magnitude of gradient feature, a phase of gradient feature, and/or a gradient spatial information feature.

The haziness confidence level may be obtained by a detector. The detector may obtain the haziness confidence level based on one or more of the modalities.

The haziness confidence level may be obtained by multiple detectors. Each detector may obtain a modality haziness confidence level based on one or more of the modalities. The modality haziness confidence levels may be combined to form the haziness confidence level.

An electronic device is also described. The electronic device includes a processor configured to determine a haziness confidence level based on multiple modalities and to determine whether to perform an action based on the haziness confidence level.

An apparatus is also described. The apparatus includes means for determining a haziness confidence level based on multiple modalities. The apparatus also includes means for determining whether to perform an action based on the haziness confidence level.

A computer-program product is also described. The computer-program product includes a non-transitory computer-readable medium with instructions. The instructions include code for causing an electronic device to determine a haziness confidence level based on multiple modalities. The instructions also include code for causing the electronic device to determine whether to perform an action based on the haziness confidence level.

DETAILED DESCRIPTION

Figure 1:
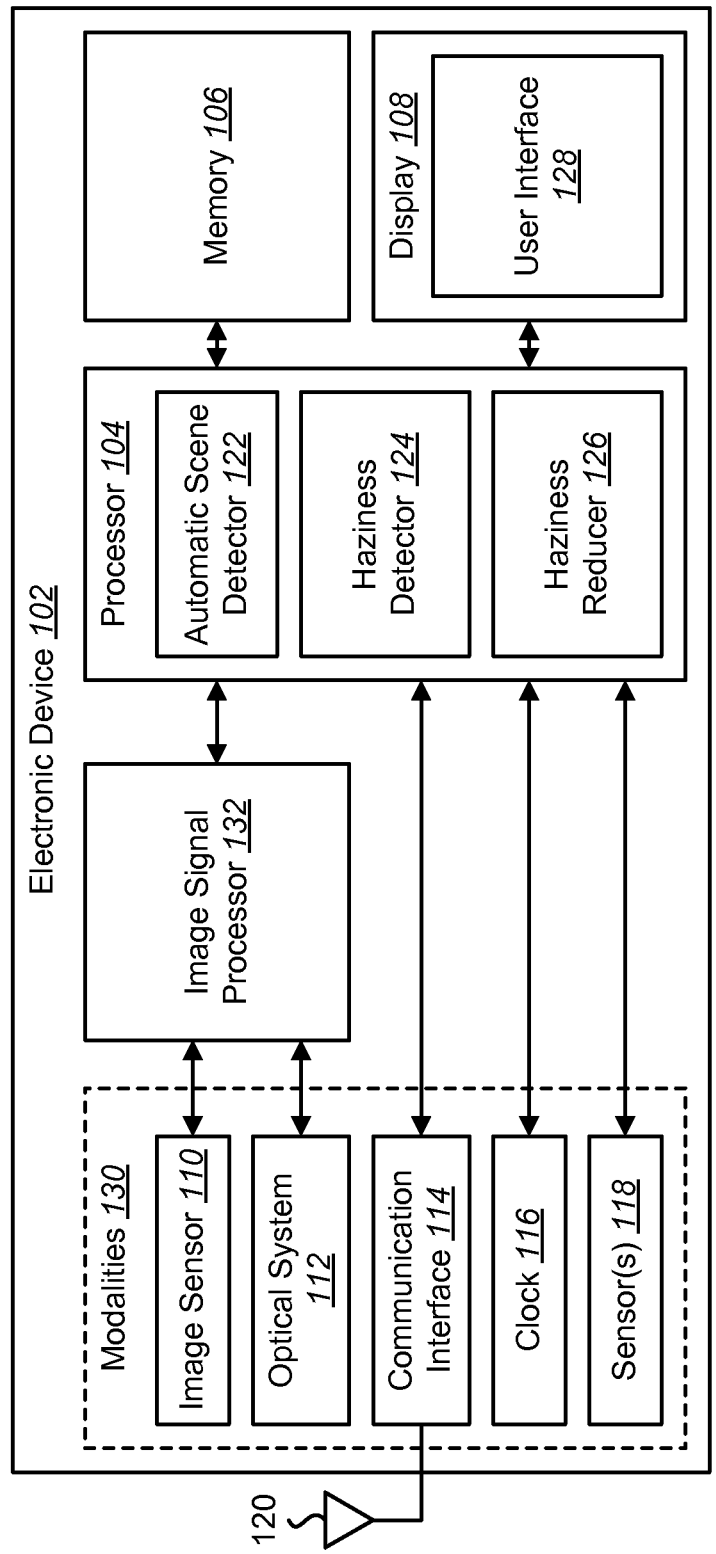
FIG. 1 is a block diagram illustrating one example of an electronic device in which systems and methods for haziness detection based on multiple modalities may be implemented.

Some configurations of the systems and methods disclosed herein may relate to haziness detection and haziness reduction using information from multiple modalities. As used herein, the terms "haze" and derivatives thereof (e.g., "hazy," "haziness," etc.) may refer to environmental scene conditions including, for example, the appearance of airborne particles such as haze, fog, steam, water vapor, air pollution (e.g., smog), rain, snow, dust, and/or smoke in a captured image. Automatic haziness detection and/or haziness reduction (e.g., de-hazing) can be very complicated, especially when the haziness detection and/or haziness reduction is based only on the camera optical input. Some reasons for this difficulty may include a large variation in lighting conditions, the color of the haziness, the location of the hazy areas and the degree of the haziness. Furthermore, there may be a large variation in scene composition (such as different subjects being within the scene). Reliable and fast haziness detection and/or haziness reduction (on electronic devices with cameras, for example) can greatly restore the visibility of the objects within a scene and improve the perception of camera users. Moreover, haziness detection and/or haziness reduction may improve computer vision processing, such as object detection, object tracking, object recognition, etc. For example, haziness detection and/or haziness reduction may improve performance for advanced driver assistance systems (ADAS).

Information from multiple modalities may be utilized to improve haziness detection. A modality may be a means for obtaining information (e.g., sensing) regarding surroundings of an electronic device or of a scene. In some configurations, multiple modalities may be readily available in electronic devices (e.g., cameras, video camcorders, digital cameras, cellular phones, smart phones, computers, televisions, automobiles, personal cameras, action cameras, surveillance cameras, mounted cameras, connected cameras, robots, drones, smart applications, healthcare equipment, set-top boxes, etc.). One or more modalities (in addition to the camera input, for example) may provide information that may be utilized to improve the accuracy of haziness detection and/or haziness reduction. Examples of such information include global positioning system (GPS) location (e.g., city versus countryside, mountain area, costal area, etc.), orientation from a compass sensor, time of day, local weather report (e.g., forecast), remote device images (e.g., satellite images, connected camera images, personal/action camera images, etc.), ambient light, temperature(s) (e.g., at one location and/or a temperature difference between two locations or environments), barometric pressure, humidity, time of year (e.g., calendar day), etc. Another example of such information may be pictures taken at the same location posted in an online service (e.g., map service, social network, etc.), which may be used as a reference to detect haziness and/or to reduce the haziness.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for haziness detection based on multiple modalities may be implemented. Examples of the electronic device 102 include smartphones, cellular phones, computers (e.g., desktop computers, laptop computers, servers, etc.), tablet devices, media players, televisions, gaming consoles, set-top boxes, personal digital assistants (PDAs), robots, aircraft, unmanned aerial vehicles (UAVs), automobiles, etc. The electronic device 102 may include one or more components or elements. One or more of the components or elements may be implemented in hardware (e.g., circuitry) or a combination of hardware and software (e.g., a processor with instructions). In some configurations, the electronic device 102 may include a processor 104, a memory 106, a display 108, an image sensor 110, an optical system 112, an image signal processor 132, a communication interface 114, a clock 116 and/or one or more sensors 118. The processor 104 may be coupled to (e.g., in electronic communication with) the memory 106, display 108, image sensor 110, optical system 112, image signal processor 132, communication interface 114, clock 116 and/or one or more sensors 118. It should be noted that although communication between the image sensor 110 and/or optical system 112 may pass via the image signal processor 132, the processor 104 may additionally or alternatively communicate directly with the image sensor 110 and/or optical system 112 in some configurations.

The communication interface 114 may enable the electronic device 102 to communicate with one or more other electronic devices. For example, the communication interface 114 may provide an interface for wired and/or wireless communications. In some configurations, the communication interface 114 may be coupled to one or more antennas 120 for transmitting and/or receiving radio frequency (RF) signals. Additionally or alternatively, the communication interface 114 may enable one or more kinds of wireline (e.g., Universal Serial Bus (USB), Ethernet, etc.) communication.

The electronic device 102 may obtain one or more images (e.g., digital images, image frames, video, etc.). For example, the electronic device 102 may include the image sensor 110 and the optical system 112 (e.g., lenses) that focuses images of objects that are located within the field of view of the optical system 112 onto the image sensor 110. In some configurations, the image sensor 110 may capture the one or more images. The optical system 112 may be coupled to and/or controlled by the image signal processor 132 and/or the processor 104. Additionally or alternatively, the electronic device 102 may request and/or receive the one or more images from another device (e.g., an external image sensor coupled to the electronic device 102, a network server, traffic camera, drop camera, automobile camera, web camera, etc.). In some configurations, the electronic device 102 may request and/or receive the one or more images via the communication interface 114. For example, the electronic device 102 may or may not include a camera (e.g., an image sensor 110 and/or optical system 112) and may receive images from a remote device.

In some configurations, the electronic device 102 may include an image data buffer (not shown). The image data buffer may buffer (e.g., store) image data from the image sensor 110. The buffered image data may be provided to the image signal processor 132 and/or to the processor 104.

In some configurations, the electronic device 102 may include an image signal processor (ISP) 132. The image signal processor 132 may receive image data from the image sensor 110 (e.g., raw sensor data and/or pre-processed sensor data). The image signal processor 132 may perform one or more operations on the image data. For example, the image signal processor 132 may perform decompanding, local tone mapping (LTM), filtering, scaling and/or cropping, etc. The image signal processor 132 may provide the resulting image data to the processor 104. For example, the image data may be image modality information.

In some configurations, the electronic device 102 may include a camera software application and a display 108. When the camera application is running, images of objects that are located within the field of view of the optical system 112 may be recorded by the image sensor 110. The images that are being recorded by the image sensor 110 may be presented on the display 108. In some configurations, these images may be displayed in rapid succession at a relatively high frame rate so that, at any given moment in time, the objects that are located within the field of view of the optical system 112 are presented on the display 108. The one or more images obtained by the electronic device 102 may be one or more video frames and/or one or more still images. The terms video frame and digital image may be used interchangeably herein.

The processor 104 may include and/or implement an automatic scene detector 122, a haziness detector 124 and/or a haziness reducer 126. The automatic scene detector 122 may control one or more aspects of image capture and/or processing. For example, the automatic scene detector 122 may control auto white balance, auto focus and/or auto exposure. For instance, the automatic scene detector 122 may control optical system 112 (e.g., lens) focus, image sensor 110 gain, image sensor 110 exposure time, etc. In some configurations, the automatic scene detector 122 may control auto white balance, auto focus and/or auto exposure for a remote electronic device (e.g., a remote camera, network device, etc.) by sending information to the remote device via the communication interface.

The haziness detector 124 may perform haziness detection based on multiple modalities 130 to determine a haziness confidence level. Each of the modalities 130 may be a means for obtaining information (e.g., sensing) regarding the surroundings of the electronic device 102. For example, the image sensor 110 and optical system 112 (which may be referred to as a camera) may be one example of a modality 130 for capturing image information regarding the surroundings of the electronic device 102.

The communication interface 114 may be a modality 130 for requesting and/or receiving information regarding the surroundings of the electronic device 102 (and/or of a remote electronic device). For example, the communication interface 114 may request and/or receive information regarding the location (e.g., latitude and longitude information, other location information, etc.) of an electronic device, the current time of day, a local weather report and/or forecast, remote device images (e.g., satellite images, connected camera images, personal/action camera images, etc.), current temperature, air pollution index, etc. In some configurations, multiple communication interfaces 114 may be implemented and/or utilized. For example, one communication interface 114 may be a global positioning system (GPS) receiver, another communication interface 114 may be a cellular (e.g., 3G, Long Term Evolution (LTE), CDMA, etc.) communication interface 114, and yet another communication interface 114 may be a wireless local area network (WLAN) interface (e.g., 802.11 interface).

The clock 116 may be a modality 130 for telling time of day. For example, the clock 116 may be utilized in addition to or alternatively from the communication interface 114 for determining a time of day.

The one or more sensors 118 may be modalities 130 for obtaining one or more types of information. Examples of the sensor(s) 118 include temperature sensors, barometric sensors, humidity sensors, accelerometers (which may be used in inertial navigation, for example), ambient light sensors, direction sensors (e.g., compass sensors), etc.

The one or more modalities 130 may provide information to the haziness detector 124. Examples of modality information include image information (e.g., one or more images, frames, etc.), remote device image information, location information, direction information, time of day, weather report and/or forecast information, satellite information (e.g., satellite images, Doppler radar, temperature, etc.), light information (which may be utilized to determine whether the electronic device 102 in indoors or outdoors, for example), temperature, air pollution index, etc. In some configurations, the electronic device 102 may additionally or alternatively request and/or receive one or more kinds of modality information from a remote electronic device. For example, a remote electronic device may include one or more of the aforementioned modalities (e.g., sensors) and may provide corresponding modality information to the electronic device 102 via the communication interface 114.

The haziness detector 124 may determine a haziness confidence level based on multiple modalities 130. For example, the haziness detector 124 may perform haziness detection based on the multiple modalities to determine a haziness confidence level. A haziness confidence level may be a measure of confidence that the captured image includes haziness and/or that the electronic device 102 surroundings are hazy. For example, the haziness detector 124 may extract one or more features from an image. The one or more features from the image and one or more kinds of (additional) modality information may be utilized to determine the haziness confidence level. In some configurations, the haziness detector 124 may employ a two-stage classification to determine the haziness confidence level. An example of two-stage classification is given in connection with FIG. 4.

In some configurations, the haziness detector 124 may employ a support vector machine (SVM) and/or a neural network classifier to determine the haziness confidence level. For example, the support vector machine classifier may be a pre-trained classifier that separates vectors (e.g., the extracted feature(s) and one or more types of additional modality information) that indicate haziness from vectors that do not indicate haziness. The classifier may be referred to as a decision boundary. For instance, the classifier may be a hyperplane that divides vectors indicating haziness from vectors that do not indicate haziness. The haziness confidence level may be reflected by the distance between the vector and the hyperplane. For instance, if a vector is on the side of the classifier that indicates haziness and is near the classifier, the haziness detector 124 may indicate that haziness is detected with a low haziness confidence level. In another instance, if a vector is on the side of the classifier that indicates haziness and is far from the classifier, the haziness detector 124 may indicate that haziness is detected with a high haziness confidence level.

In some configurations, the classifier (e.g., decision boundary) may be pre-trained. For example, the classifier (e.g., SVM boundary) may be trained using pre-labeled hazy scene and non-hazy scene images (e.g., through a gradient descent method). For instance, a training data set may be utilized to train an SVM classifier and/or a neural network classifier. In some configurations, each sample of the training data set may include a data point from each modality (e.g., a 2D image, GPS, time of day, day of the year, weather report/forecast for that location at the time the image is taken, air pollution index for that day, etc., and a binary annotation to indicate whether the image is hazy or not). The training data set may be utilized to generate the support vector in SVM and/or weights/bias for each layer in the neural network through back-propagation.

In some configurations, determining the haziness confidence level may be accomplished as follows. In an SVM approach, the haziness confidence level (e.g., hazy score) may be computed as the inner product of the input data (e.g., the image or extracted features and/or one or more kinds of modality information) and the supporting vectors. For example, the haziness detector 124 may compute an inner product of the supporting vectors and a vector based on the input data (e.g., (2D) image, GPS, time of day and/or day of the year, etc.). In a neural network approach, the haziness detector 124 may put the input data through multiple layers with combinations of weights and biases. The output from the final layer may be the haziness confidence level (e.g., hazy score).

The processor 104 may determine whether to perform an action based on the haziness confidence level. For example, the processor 104 may determine to perform an action in a case that the haziness confidence level satisfies one or more criteria (e.g., in a case that the haziness confidence level is greater than or equal to a particular level (e.g., a haziness threshold level)).

Examples of actions based on the haziness confidence level may include image processing (e.g., haziness reduction) and non-haziness reduction actions. In some configurations, the electronic device 102 (e.g., processor 104) may only perform image processing based on the haziness confidence level. In other configurations, the electronic device 102 may only perform one or more non-image processing actions (e.g., non-haziness reduction action(s)). In yet other configurations, the electronic device 102 may perform one or more image processing actions in combination with one or more non-image processing actions.

For example, the electronic device 102 (e.g., processor 104) process the image based on the haziness confidence level. In some configurations, processing the image may include performing haziness reduction. For example, the processor 104 may include and/or implement a haziness reducer 126. The haziness reducer 126 may not perform haziness reduction if the haziness confidence level is low (e.g., below a haziness threshold). If the haziness confidence level is high enough (e.g., meets or exceeds the haziness threshold), the processor 104 may perform haziness reduction. In some configurations, the degree of haziness reduction performed may be determined based on the haziness confidence level. For example, greater haziness reduction may be performed for a greater haziness confidence level. Reducing haziness may include adjusting local tone mapping (LTM), auto white balance, auto focus, auto exposure, color correction, and/or sharpness.

It should be noted that haziness reduction may be performed on the current image (e.g., frame) and/or on a subsequent image (e.g., frame). For example, an electronic device 102 may perform haziness detection on a frame. Haziness reduction may be performed on that frame by adjusting, for example, color, exposure, and/or sharpness. Additionally or alternatively, haziness reduction may be performed by adjusting auto white balance, auto focus, and/or auto exposure (in addition to or alternatively from adjusting color, exposure and/or sharpness) for a subsequent frame.

Examples of non-image processing actions may include one or more of activating fog lights, activating a notification light, activating a notification tone, activating a heating and/or cooling system (e.g., heating, ventilating and air conditioning (HVAC) system) for haziness (e.g., fogginess, condensation, etc.) on a windshield, and displaying one or more objects (e.g., lane marker(s), vehicle marker(s), road edge marker(s), barrier marker(s), etc., on a heads-up display, windshield projector or other display, for example), etc. One or more non-image processing actions may be performed by an ADAS and/or in conjunction with an ADAS in some configurations. Another example of non-haziness reduction actions may include sending haziness information (e.g., haziness confidence level) to a remote device. For instance, the electronic device 102 may be a server that receives image data (and optionally additional modality information) from a remote device. The electronic device 102 may determine haziness information and send the haziness information to the remote device. In some configurations, the remote device may optionally perform haziness reduction based on the haziness information.

The memory 106 may store instructions and/or data. The processor 104 may access (e.g., read from and/or write to) the memory 106. Examples of instructions and/or data that may be stored by the memory 106 may include image data, modality information, haziness confidence level(s), automatic scene detector instructions, haziness detector instructions, haziness reducer instructions, etc.

In some configurations, the electronic device 102 may present a user interface 128 on the display 108. For example, the user interface 128 may enable a user to interact with the electronic device 102. In some configurations, the user interface 128 may enable a user to indicate whether haziness is present (in the environment and/or in a captured image, for example).

In some configurations, the display 108 may be a touchscreen that receives input from physical touch (by a finger, stylus or other tool, for example). For instance, the touchscreen may be an input interface that receives touch input indicating whether haziness is present or not. Additionally or alternatively, the electronic device 102 may include or be coupled to another input interface. For example, the electronic device 102 may include a camera facing a user and may detect user gestures (e.g., hand gestures, arm gestures, eye tracking, eyelid blink, etc.) for indicating whether haziness is present. In another example, the electronic device 102 may be coupled to a mouse and may detect a mouse click indicating whether haziness is present. Thus, whether haziness is present may be indicated in any suitable way (e.g., a touch input, a mouse click, a recognized gesture, etc.). Accordingly, the modalities 130 may include means for receiving user input in some configurations. For example, the sensor(s) 118 may include a touchscreen display 108 (and/or the user interface 128) for receiving user input indicating haziness (or no haziness). Additionally or alternatively, the modalities 130 may include an input interface (e.g., input port for an input device such as a mouse, a touch pad, a camera, a microphone, etc.) for receiving user input indicating haziness (or no haziness).

It should be noted that no user input may be necessary in some configurations. For example, the electronic device 102 may automatically detect haziness and/or reduce haziness in the one or more images.

Figure 2:
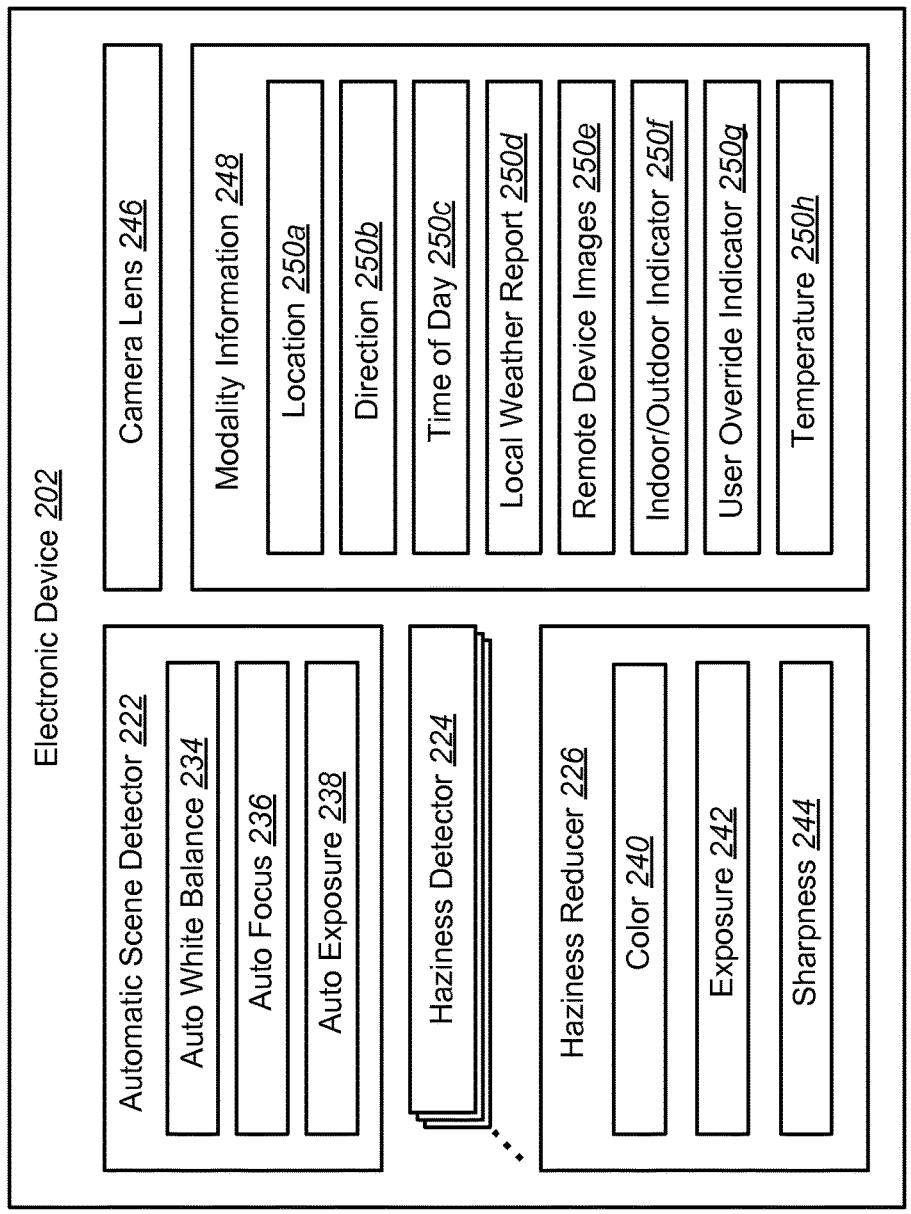
FIG. 2 is a block diagram illustrating an example of one configuration of an electronic device in which systems and methods for haziness detection and/or haziness reduction may be implemented.

FIG. 2 is a block diagram illustrating an example of one configuration of an electronic device 202 in which systems and methods for haziness detection and/or haziness reduction may be implemented. The electronic device 202 of FIG. 2 may be one example of the electronic device 102 of FIG. 1. The electronic device 202 may include a camera lens 246 that obtains images (e.g., photographs and/or video). Additionally or alternatively, the electronic device 202 may obtain images from a remote device.

The electronic device 202 may include one or more haziness detectors 224. Each haziness detector 224 may determine a haziness confidence level of a scene viewed by the camera lens 246 based on one or more modalities. Each of the modalities may produce modality information 248. Examples of modality information 248 include the location 250a of the electronic device 202 (and/or the location of the scene being photographed, for example), the direction 250b of the electronic device 202 (e.g., which direction the electronic device 202 is pointing), the time of day 250c, a local weather report 250d (e.g., forecast), one or more remote device images 250e, an indoor/outdoor indicator 250f, a user override indicator 250g, and a temperature 250h. It should be noted that image modality information, which may be obtained from an image sensor and/or optical system (e.g., camera lens 246) may also be included in the modality information 248.

Each of the modalities may be readily available to the electronic device 202 (e.g., as mobile phones). For example, the location 250a may be obtained using GPS functionality on the electronic device 202 to determine whether the electronic device 202 is located in a city, a countryside, a mountain area or a coastal area, etc. The location 250a may be utilized to determine an altitude in some configurations. The direction 250b may be based on information from a compass (e.g., orientation) sensor to determine the direction of the camera (e.g., towards the ocean or away from the ocean). Other modality information 248 may also be readily obtained by the electronic device 202. For example, pictures taken at the same location (e.g., location 250a) that are posted on a map web service and/or a social network may be used as references to detect haziness (e.g., haze, fog, smoke, etc.) and to perform haziness reduction (e.g., locations with previous instances of haze are more likely to currently have haze). Each of the modalities may be more or less useful (e.g., more or less indicative of haziness), depending on the specific location (e.g., location 250a) of the electronic device 202.

The time of day 250c may be obtained from a clock on the electronic device 202 and/or by requesting the time from a remote electronic device (e.g., a global navigation satellite system (GNSS), a location server, a base station, access point, a web server, etc.). The time of day 250c may be utilized in combination with one or more of the other modality information 248. For example, the time of day 250c may be indicative of haziness in combination with the location 250a and the direction 250b of the electronic device 202. For example, an image captured by the electronic device 202 may be likely to contain haze when the electronic device 202 is pointed at a coastal scene (e.g., near a pier or beach) in the morning hours during the winter in a coastal area.

The local weather report 250d may be obtained via a communication interface. For example, the electronic device 202 may request a local weather report 250d from a remote electronic device (e.g., web server). The local weather report 250d may indicate local weather conditions (e.g., fog, smog, haze, wind, rain, snow, cloudiness, visibility, clarity, etc.), temperature, humidity, barometric pressure, etc., that may indicate a likelihood of haziness in the area. The local weather report 250d may be utilized in combination with one or of the other modality information 248.

The remote device images 250e may be obtained via a communication interface. The remote device images 250e may include image information (e.g., one or more images) received from one or more remote devices. For example, the electronic device 202 may obtain the remote device image(s) 250e from one or more network devices (e.g., web servers), one or more satellites, one or more vehicles (e.g., one or more interior and/or exterior vehicle camera(s)), infrastructure (e.g., traffic camera(s), security camera(s), etc.), one or more connected cameras (e.g., drop cams), one or more personal/action cameras, etc. Some remote devices may not have image signal processing capabilities sufficient for haziness detection and/or haziness reduction. Additionally or alternatively, the electronic device 202 may not include an integrated camera in some configurations and may operate to detect haziness and/or reduce haziness in an image captured by a remote device (instead of in an image captured from an integrated camera, for example).

In one example, the electronic device 202 may request satellite images from a remote electronic device (e.g., web server). For instance, the satellite images may be provided by a weather service, mapping service, or some other web service. In other configurations, the electronic device 202 may receive the remote device images 250e directly from a satellite. The remote device images 250e may indicate local weather conditions (e.g., fog, smog, haze, cloudiness, precipitation, etc.). Additionally or alternatively, the remote device images 250e may provide a color of the surroundings when haze is not present. Accordingly, the remote device images 250e may indicate a likelihood of haziness in the area. For instance, cloud cover over an area may indicate an increased likelihood of haziness.

In some configurations, the remote device images 250e may be utilized in combination with one or more of the other modality information 248. For example, satellite images may be utilized in combination with an image captured from the camera lens 246. The color of the satellite image(s) may be compared with the color from the captured image. If the captured image has a dull or muted color in comparison with the satellite images, this may indicate an increase likelihood of haziness.

The indoor/outdoor indicator 250f may be obtained via an ambient light sensor. For example, the electronic device 202 may check the brightness of the ambient light provided by an ambient light sensor. Brightness over a brightness threshold may indicate that the electronic device 202 is outdoors. Additionally or alternatively, the indoor/outdoor indicator 250f may be derived from the location 250a. For example, the location information 250a may indicate whether the electronic device 202 is likely in a structure or outdoors. Accordingly, the indoor/outdoor indicator 250f may indicate a likelihood of haziness in the area (as haziness may be more likely to occur outdoors, for example). The indoor/outdoor indicator 250f may be utilized in combination with one or of the other modality information 248. For example, the indoor/outdoor indicator 250f may be utilized in combination with the location 250a, the direction 250b and the local weather report 250d. For instance, if the indoor/outdoor indicator 250f indicates that the electronic device 202 is indoors, but the location 250a indicates that the electronic device 202 is near the edge of the building, the direction 250b indicates that the electronic device 202 camera is pointing outwards from the building and the local weather report 250d indicates fog, this may be a scenario in which a user is taking a picture out of a window with an increased likelihood of haziness. In other scenarios, however, if the indoor/outdoor indicator 250f indicates that the electronic device 202 is indoors, there may be a decreased likelihood of haziness.

The user override indicator 250g may be obtained via a user interface. For example, the electronic device 202 may detect a touch or click event on a user interface object (e.g., button, text, etc.) that indicates haziness or no haziness. For example, the electronic device 202 may receive a user input that indicates haziness or no haziness. The user override indicator 250g may indicate that there is haziness or not in an image. The user override indicator 250g may be utilized in combination with one or more of the other modality information 248. For example, even if the electronic device 202 determines (from multiple modalities) that no haziness is detected (and/or a low haziness confidence level), but the user override indicator 250g indicates that there is haziness, the haziness detector 224 may be overridden to detect haziness. In some configurations, user override indicators 250g may be utilized to update the classifier training.

The temperature 250h may be obtained via a temperature sensor (e.g., heat sensor) and/or via a communication interface. For example, the electronic device 202 may obtain a temperature reading from a temperature sensor included in the electronic device 202 and/or may request and/or receive a temperature reading from a remote electronic device (e.g., web server). For instance, the temperature 250h may be part of a local weather report 250d in some configurations. The temperature 250h may indicate the temperature of the electronic device 202 and/or an outdoor temperature. Accordingly, the temperature 250h may indicate a likelihood of haziness in the area (as haziness may tend to occur in certain temperature ranges, for example). In some configurations, a temperature differential may be utilized. For example, haziness may be more likely to occur when a temperature of the electronic device 202 is at a particular differential from the outdoor temperature. For instance, if the electronic device 202 is in a car with a temperature at a certain differential from the outdoor temperature, haziness (e.g., condensation, frost, etc.) may be likely to occur on the windshield. The temperature 250h may be utilized in combination with one or more of the other modality information 248. For example, the temperature 250h may be utilized in combination with the location 250a, where certain locations (e.g., near water) may exhibit increased likelihood for haziness at certain temperatures.

Certain environmental scene conditions (e.g., weather, lighting, etc.) may cause features in the image to appear less clear. For example, a vehicle may be traveling through fog or through rain. In addition, a window (e.g., a windshield) through which the image sensor captures the image may be foggy due to a difference between a temperature inside of the vehicle and a temperature outside of the vehicle, or may be otherwise unclear due to condensate or frost. When features in an image are difficult to discern (e.g., the image is "hazy"), the image may indicate an environmental scene condition (e.g., rain, fog, a foggy windshield, smog, haze etc.). In configurations where the systems and methods are used in conjunction with a vehicle assistance application (e.g., advanced driver assistance systems (ADAS) and/or an augmented display), a hazy image may be an indicator that an operator of the vehicle may not be able to see features (e.g., traffic signs, traffic lanes, pedestrians, other vehicles, trees, etc.) of the scene outside of the vehicle. The haziness detector(s) 224 may detect hazy images from the image sensor.

In some implementations, the haziness detector(s) 224 may determine whether a window (e.g., a windshield) that the image sensor faces is foggy or whether the camera lens 246 of the image sensor is wet or foggy. To illustrate, the image sensor may be located within a cabin, such as a passenger cabin of the vehicle, and may be positioned to capture a scene through a window of the vehicle. The haziness detector(s) 224 may receive the sensor data that is associated with and/or corresponds to multiple temperatures 250h, such as a first temperature inside the vehicle and a second temperature outside of the vehicle. The haziness detector(s) 224 may be configured to determine a temperature difference between the first temperature and the second temperature. When the temperature difference indicates that a difference between the first temperature (inside the vehicle) exceeds the temperature (outside the vehicle), the haziness detector(s) 224 may determine that the image captured by the image sensor is hazy in part because the window that the image sensor faces is foggy. In response to a determination that the window is foggy, the haziness detector(s) 224 may perform image processing (e.g., haziness reduction) based on the haziness confidence level. In some configurations, the electronic device 202 initiates an action, such as activating a heating, ventilation, or air conditioning (HVAC) system and/or a windshield wiper, as illustrative, non-limiting examples.

In another example, the haziness detector(s) 224 may determine that haziness is in a scene outside of a vehicle (not condensation on a window or foggy windshield, for instance). In this case, the haziness detection may initiate one or more actions. These actions may be different from one or more actions initiated for a foggy windshield. For haziness due to the scene outside of a vehicle, for example, the action(s) may include dehazing in a heads up display and/or ADAS functionality (e.g., breaking, slowing, lane marking, audible alerts, etc.).

It should be noted that although some modality information 248 is illustrated in FIG. 2, fewer, more, and/or different kinds of modality information 248 may be utilized. For example, barometric pressure, day of the year, humidity and/or other kinds of modality information 248 may be utilized. For instance, barometric pressure may be obtained from a barometric pressure sensor on the electronic device 202 and/or from the communication interface (e.g., from a remote web server, as part of a local weather report, etc.). The day of the year may be obtained from a calendar application on the electronic device 202 and/or from the communication interface (e.g., from a remote web server.). The humidity may be obtained from a humidity sensor on the electronic device 202 and/or from the communication interface (e.g., from a remote web server, as part of a local weather report, etc.). Another example of modality information 248 may be weather almanac information, which may be obtained from the communication interface (e.g., from a remote web server.). Another example of modality information 248 may be air pollution information (e.g., an air pollution index), which may be obtained from the communication interface (e.g., from a remote web server.). One or more of these modality information 248 may have a bearing on the likelihood of haziness occurring. Accordingly, the one or more haziness detectors 224 may utilize multiple modalities to determine a haziness confidence level.

In some configurations, the electronic device 202 may perform haziness reduction by a haziness reducer 226 based on multiple modalities. The haziness reducer 226 may provide for adjustments to color 240, exposure 242, and/or sharpness 244, thereby removing or reducing the effect of haze on a particular scene and/or photograph. It should be noted that the haziness reducer 226, the automatic scene detector 222 or both may adjust contrast in order to perform haziness reduction. The results of the haziness detector 224 can also be used to adjust the settings within an automatic scene detector 222 (e.g., 3A module). For example, the automatic scene detector 222 may include settings for and/or control auto white balance 234, auto focus 236 and auto exposure 238. It should be noted that the electronic device 202 may additionally or alternatively perform haziness reduction by controlling (e.g., adjusting) auto white balance 234, auto focus 236, and/or auto exposure 238.

Figure 3:
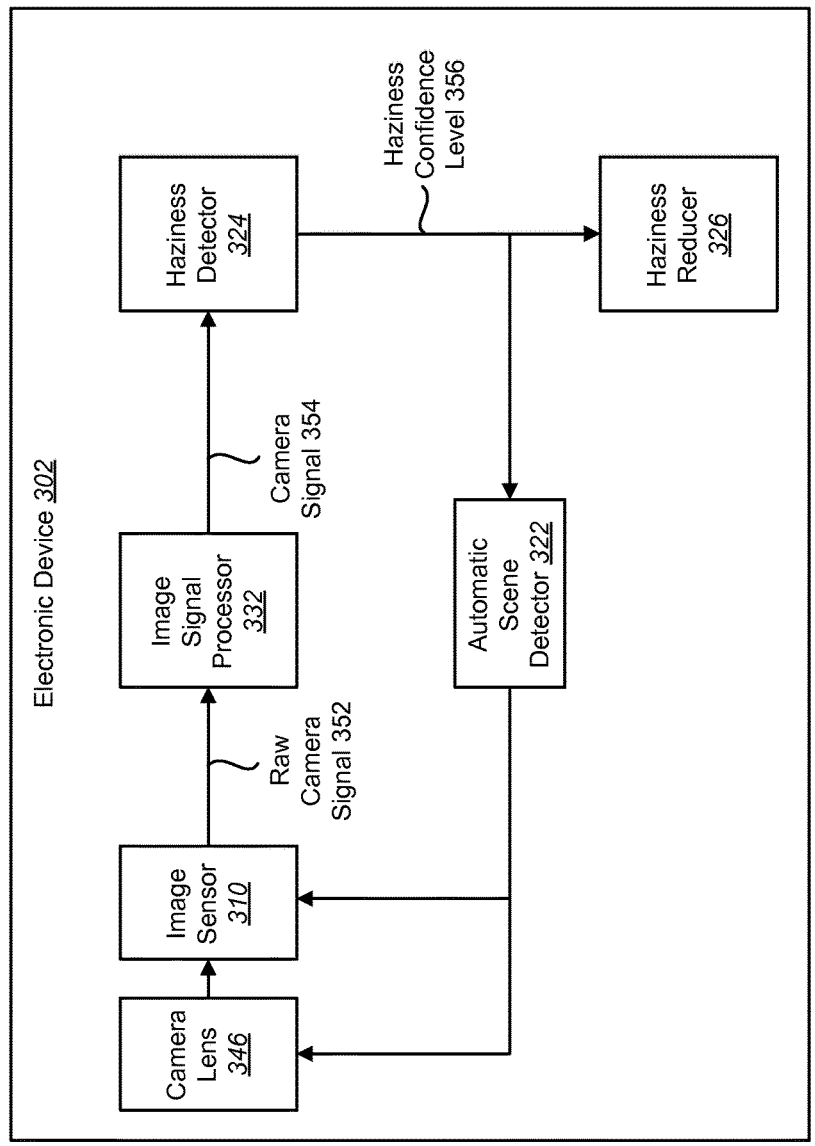
FIG. 3 is a block diagram illustrating another example of a configuration of an electronic device in which systems and methods for haziness detection and/or haziness reduction may be implemented.

FIG. 3 is a block diagram illustrating another example of a configuration of an electronic device 302 in which systems and methods for haziness detection and/or haziness reduction may be implemented. The electronic device 302 may include a camera lens 346. The camera lens 346 may be one example of the camera lens 246 described in connection with FIG. 2. The camera lens 346 may focus light on the image sensor 310. The image sensor 310 may be one example of the image sensor 110 described in connection with FIG. 1. The image sensor 310 may provide a raw camera signal 352 to an image signal processor 332. The image signal processor 332 may be one example of the image signal processor 132 described in connection with FIG. 1. The image signal processor 332 may be a specialized digital signal processor (DSP) that is used for image processing by the electronic device 302. The image signal processor 332 may convert the raw camera signal 352 into a camera signal 354. In some configurations, the image signal processor 332 or a separate resizer may resize an image (e.g., resize a red-green-blue (RGB) plane). For example, the image signal processor 332 or a separate resizer may resize an image or frame to Quarter Video Graphics Array (QVGA). Resizing may provide comparable accuracy and less computation. Resizing may be performed before feature extraction (e.g., feature extraction by the haziness detector 324). The camera signal 354 may be provided to a haziness detector 324. The haziness detector 324 may be one example of the haziness detector 124 described in connection with FIG. 1.

In some configurations, an electronic device (e.g., electronic device 102, 202, 302) may include an image signal processor (e.g., image signal processor 132, 332), but may not include a camera (e.g., may not include a camera lens 246, 346, image sensor 110 and/or optical system 112). In these configurations, the electronic device (e.g., electronic device 102, 202, 302) may receive image data (e.g., a camera signal) from a remote device (e.g., from a separate camera). For example, an electronic device (e.g., electronic device 102, 202, 302) may receive image data from a remote electronic device (e.g., a network server, a separate camera coupled to the electronic device, etc.). Accordingly, haziness detection may be performed on the electronic device. Haziness reduction may be performed on the electronic device and/or in coordination with a remote electronic device. For example, the electronic device 302 may send one or more adjustments to a remote image sensor and/or camera lens (e.g., adjustments to lens focus, image sensor gain, image sensor exposure time, etc.).

The haziness detector 324 may determine whether haziness is detected within the scene viewed by the camera lens 346. More specifically, the haziness detector 324 may perform haziness detection based on multiple modalities to determine a haziness confidence level 356. This may be accomplished as described in connection with one or more of FIGS. 1 and 2. More examples of haziness detection are given in connection with one or more of FIGS. 4-9. For instance, the haziness detector 324 may employ two-stage classification to reduce computational complexity in some configurations. In some examples, the classifier(s) may employ linear support vector machine (SVM), where it may not be necessary to save all of the support vectors in the model. The haziness confidence level 356 may reflect the relative confidence that the haziness detector 324 has detected haziness within the scene viewed by the camera lens 346. For example, a low haziness confidence level 356 may indicate that any haziness in the scene is minimal and/or unlikely. In cases with a low haziness confidence level 356, haziness reduction processing may be reduced and/or not performed. A high haziness confidence level 356 may indicate that the scene includes significant haziness and/or that haziness is likely. In a case with a high haziness confidence level 356, increased haziness reduction may be employed to remove and/or reduce haziness from the scene.

The haziness confidence level 356 may be provided to a haziness reducer 326. The haziness reducer 326 may reduce the amount of haziness in a scene viewed by the camera lens 346. For example, the haziness reducer 326 may adjust color, exposure, and/or sharpness settings to reduce and/or remove the perceived haziness. A more specific example of haziness reduction is given in connection with one or more of FIGS. 9-10. The haziness confidence level 356 may also be provided to an automatic scene detector 322 (e.g., 3A module). The automatic scene detector 322 (e.g., 3A module) may adjust the auto white balance, the auto focus and/or the auto exposure based on the haziness confidence level 356 to reduce/remove haziness from the scene viewed by the camera lens 346.

Figure 4:
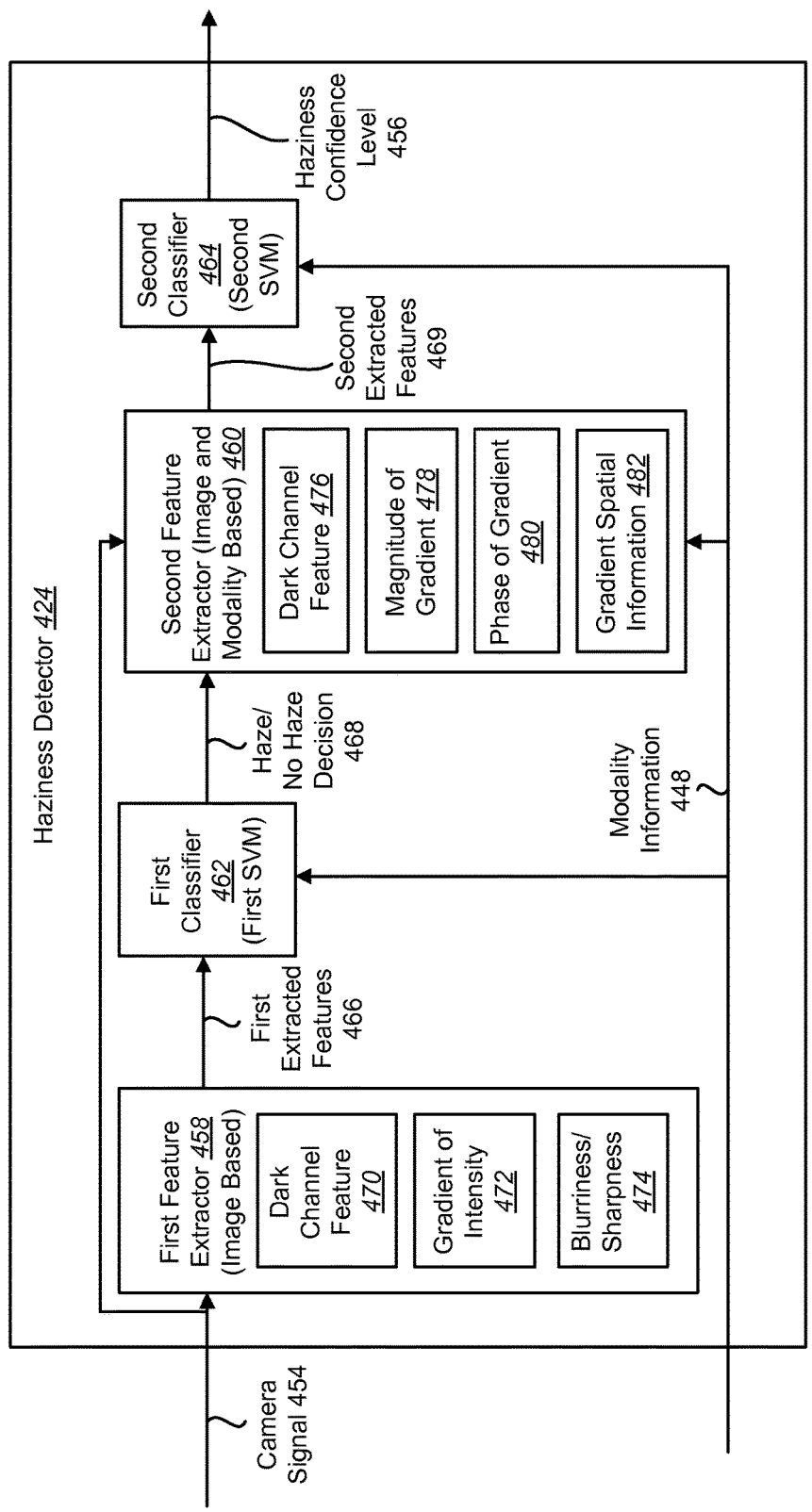
FIG. 4 is a block diagram of an example of one configuration of a haziness detector.

FIG. 4 is a block diagram of an example of one configuration of a haziness detector 424. The haziness detector 424 of FIG. 4 may be one configuration of one or more of the haziness detectors 124, 224, 324 described in connection with one or more of FIGS. 1-3. The haziness detector 424 may receive a camera signal 454. The camera signal 454 may be a signal received via a camera lens, image sensor and/or image signal processor. Alternatively, the camera signal 454 may be received from a remote device (e.g., a remote camera). In some configurations, the camera signal 454 may be processed using an image signal processor prior to providing the camera signal 454 to the haziness detector 424.

In some configurations, the haziness detector 424 may be based on a two-stage classification. It should be noted that fewer or more stages may be used for classification (e.g., a multi-stage classification system). A first stage of the classification system may include a first feature extractor 458 (image based, for example) and a first classifier 462. A second stage of the classification system may include a second feature extractor 460 (image and modality based, for example) and a second classifier 464. In some configurations, one or more of the classifiers 462, 464 may be based on support vector machines (SVMs).

The first feature extractor 458 may perform feature extraction. In some configurations, the first feature extractor 458 may use less computation power than the second feature extractor 460. The first feature extractor 458 may receive the camera signal 454. The first feature extractor 458 may then extract one or more first extracted features 466 from the camera signal 454. Examples of features that may be extracted include color features (such as a dark channel feature 470) and spatial features (such as the gradient of intensity 472, a blurriness/sharpness indicator 474, and/or a magnitude/phase of the gradient). The first feature extractor 458 may provide the one or more first extracted features 466 to the first classifier 462. The first classifier 462 may also receive one or more kinds of modality information 448. As discussed above, the modality information 448 may be additional information related to haziness that is/are available to the electronic device (via the one or more sensors, via the Internet, etc.).

Based on the extracted features and the modality information 448, the first classifier 462 may output a haze/no haze decision 468 to the second feature extractor 460. If the first classifier 462 outputs a no haze decision 468, then no additional computing may be performed regarding haziness, as haziness is not detected. However, if the first classifier 462 outputs a haze decision 468, then at least some haziness has been detected and the second feature extractor 460 may extract one or more second extracted features 469.

In some configurations, the second feature extractor 460 may employ more computationally intense feature extraction to obtain more specific extracted features from the camera signal 454. For example, the second feature extractor 460 may obtain one or more second extracted features 469 from the camera signal 454 that are based on both the image and one or more additional kinds of modality information 448. Examples of features extracted by the second feature extractor 460 include a dark channel feature 476, the magnitude of the gradient 478, the phase of the gradient 480, and/or gradient spatial information 482. Thus, the second feature extractor 460 may provide more advanced extracted features than the first feature extractor 458 in some configurations. This approach may allow saving computational resources in cases where no haze is detected with less demanding extraction.

The second feature extractor 460 may provide one or more of the second extracted features 469 to the second classifier 464. Based on the one or more extracted features and one or more kinds of modality information 448, the second classifier 464 may output a haziness confidence level 456. The haziness confidence level 456 may reflect the confidence that haziness is included within the camera signal 454.

In some configurations, an SVM classifier in each stage may be trained on the extracted features from a training data set to create a decision boundary in the high dimensional feature space to differentiate hazy scenes from non-hazy scenes. In detection, the SVM may be applied to the same set of features. The SVM may evaluate whether the input image falls to one side of the decision boundary or the other. A suitable operating point of each SVM classifier may be selected to achieve improved (e.g., optimal) precision/efficiency tradeoff. For example, a linear-kernel SVM may be used for both the first stage and the second stage (in a two-stage configuration). A binary decision may be made at the first stage based on one operating point. The second stage may output a continuous haziness confidence level 456.

Figure 5:
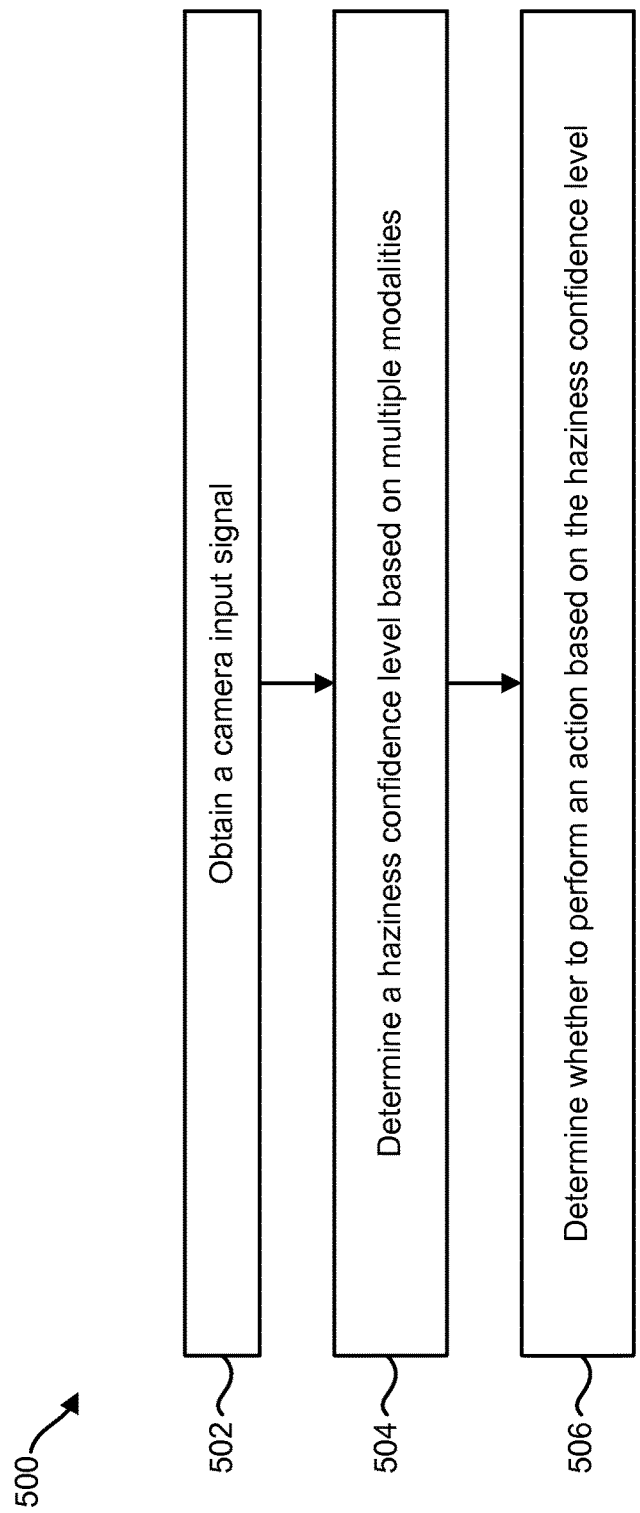
FIG. 5 is a flow diagram illustrating one configuration of a method for haziness detection based on multiple modalities.

FIG. 5 is a flow diagram illustrating one configuration of a method 500 for haziness detection based on multiple modalities. The method 500 may be performed by an electronic device (e.g., one or more of electronic devices 102, 202, 302). The electronic device may be configured with a haziness detector (e.g., haziness detector(s) 124, 224, 324, 424).

The electronic device may optionally obtain 502 a camera input signal (e.g., one or more images). For example, the camera input signal may be obtained via a lens, an image sensor, and/or an image signal processor as described above in connection with one or more of FIGS. 1-4. Alternatively, the camera input signal may be obtained from a remote device (e.g., a remote camera coupled to the electronic device, a network server in communication with the electronic device, etc.). This may be accomplished as described in connection with one or more of FIGS. 1-4.

The electronic device may determine 504 a haziness confidence level based on multiple modalities. For example, the electronic device may perform haziness detection based on multiple modalities to determine a haziness confidence level. This may be accomplished as described above in connection with one or more of FIGS. 1-4. For example, the electronic device may extract one or more features from one or more images (e.g., from the camera input signal) and classify the image based on the feature(s) and one or more (additional) kinds of modality information. In some configurations, haziness detection may be performed based on a two-stage classification.

The electronic device may determine 506 whether to perform an action based on the haziness confidence level. This may be accomplished as described in connection with one or more of FIGS. 1-3. For example, the electronic device may determine 506 to perform an action in a case that the haziness confidence level satisfies one or more criteria (e.g., in a case that the haziness confidence level is greater than or equal to a haziness threshold level). Examples of actions based on the haziness confidence level may include image processing action(s) (e.g., haziness reduction) and non-image processing action(s). For example, the electronic device may perform haziness reduction based on the haziness confidence level as described in connection with one or more of FIGS. 1-3. Additionally or alternatively, the electronic device may perform non-image processing action(s) based on the haziness confidence level as described in connection with FIG. 1.

Figure 6:
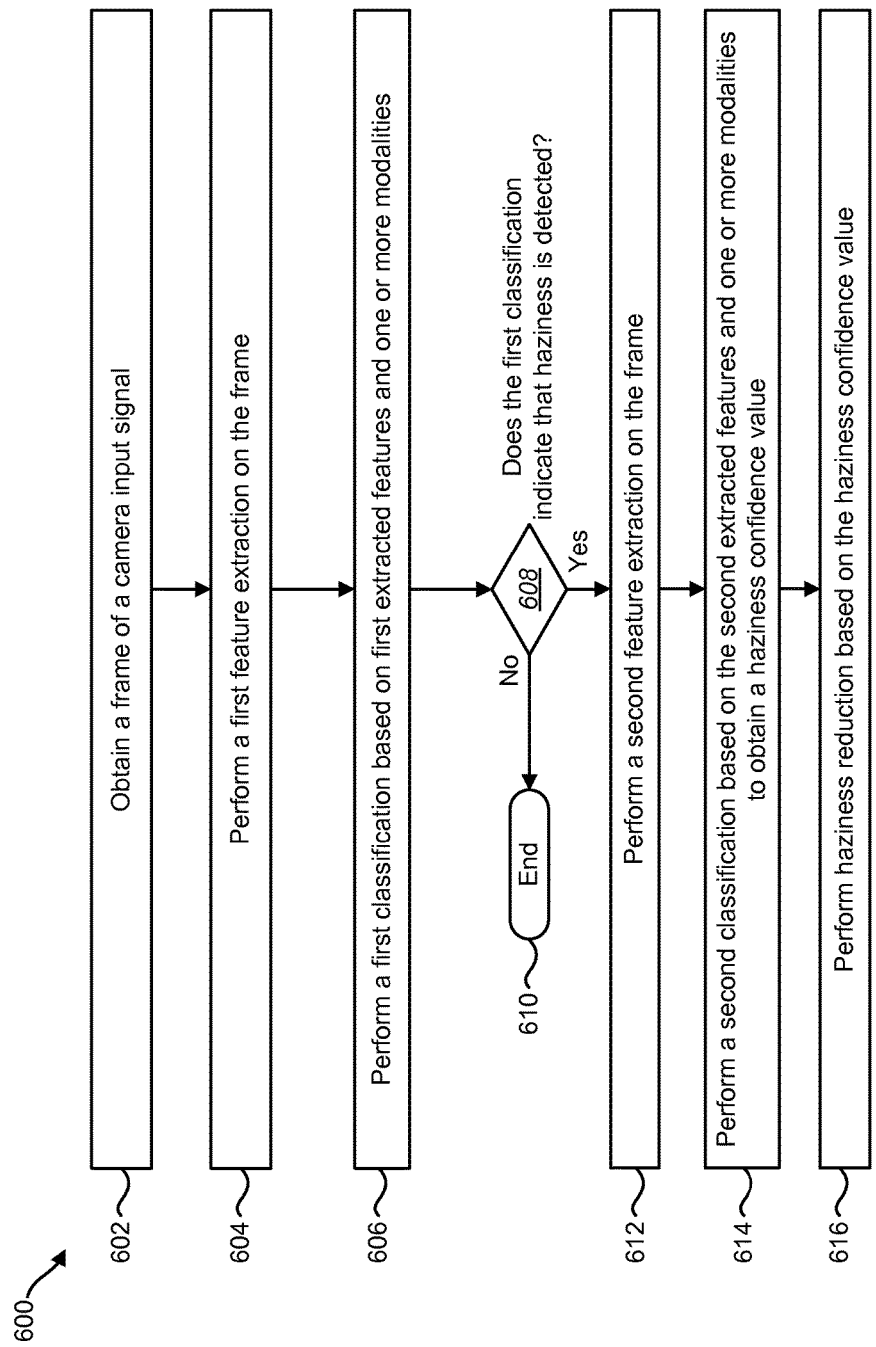
FIG. 6 is a flow diagram illustrating a more specific configuration of a method for haziness detection based on multiple modalities.

FIG. 6 is a flow diagram illustrating a more specific configuration of a method 600 for haziness detection based on multiple modalities. The method 600 may be performed by an electronic device (e.g., one or more of electronic devices 102, 202, 302). The electronic device may be configured with a haziness detector (e.g., haziness detector(s) 124, 224, 324, 424).

The electronic device may obtain 602 a frame (e.g., image) of a camera input signal. This may be accomplished as described above in connection with one or more of FIGS. 1-4. For example, the electronic device may obtain 602 one or more images via a lens, an image sensor, and/or an image signal processor.

The electronic device may perform 604 a first (e.g., basic) feature extraction on the frame. This may be accomplished as described above in connection with FIG. 4. For example, the electronic device may determine a dark channel feature of the frame, a gradient of intensity of the frame, and/or a blurriness/sharpness indicator of the frame.

The electronic device may perform 606 a first classification based on the first extracted features and one or more modalities. This may be accomplished as described above in connection with FIG. 4. In some configurations, the first classification may use a support vector machine (SVM) to determine whether haziness is detected in the frame or not.

The electronic device may determine 608 whether the first classification indicates that haziness is detected in the frame. This may be accomplished as described above in connection with FIG. 4. For example, if a vector (based on the first extracted features and/or one or more kinds of modality information) is located on one side of the decision boundary, the first classification may indicate that haze is detected. If the vector falls on the other side of the decision boundary, however, haziness may not be detected. If haziness is not detected, then operation may end 610.

If haziness is detected in the frame, the electronic device may perform 612 a second (e.g., more intensive) feature extraction on the frame. This may be accomplished as described above in connection with FIG. 4. In some configurations, the second feature extraction may include more computationally intense feature extractions, such as gradient spatial information, gradient phase information, gradient magnitude information, and/or additional dark channel features. Unlike the first feature extraction in some configurations, for example, the second feature extraction may be based on one or more modalities. For example, the second feature extraction may be based on the location of the electronic device, the direction the electronic device is facing, the time of day, etc.

The electronic device may perform 614 a second classification based on the second extracted features and one or more modalities to obtain a haziness confidence level. This may be accomplished as described above in connection with FIG. 4. In some configurations, the second classification may use a support vector machine (SVM) to determine a haziness confidence level that haziness is detected in the frame. The second classification may be based on the second extracted features and one or more modalities.

The electronic device may optionally perform 616 haziness reduction based on the haziness confidence level. This may be accomplished as described above in connection with one or more of FIGS. 1-3. For example, the electronic device may adjust the auto white balance, the auto focus, the auto exposure, the color, the sharpness, and/or the local contrast to reduce/remove the visible haziness. Thus, the haziness reduction may include signal processing and adjusting one or more physical settings of the camera.

Figure 7:
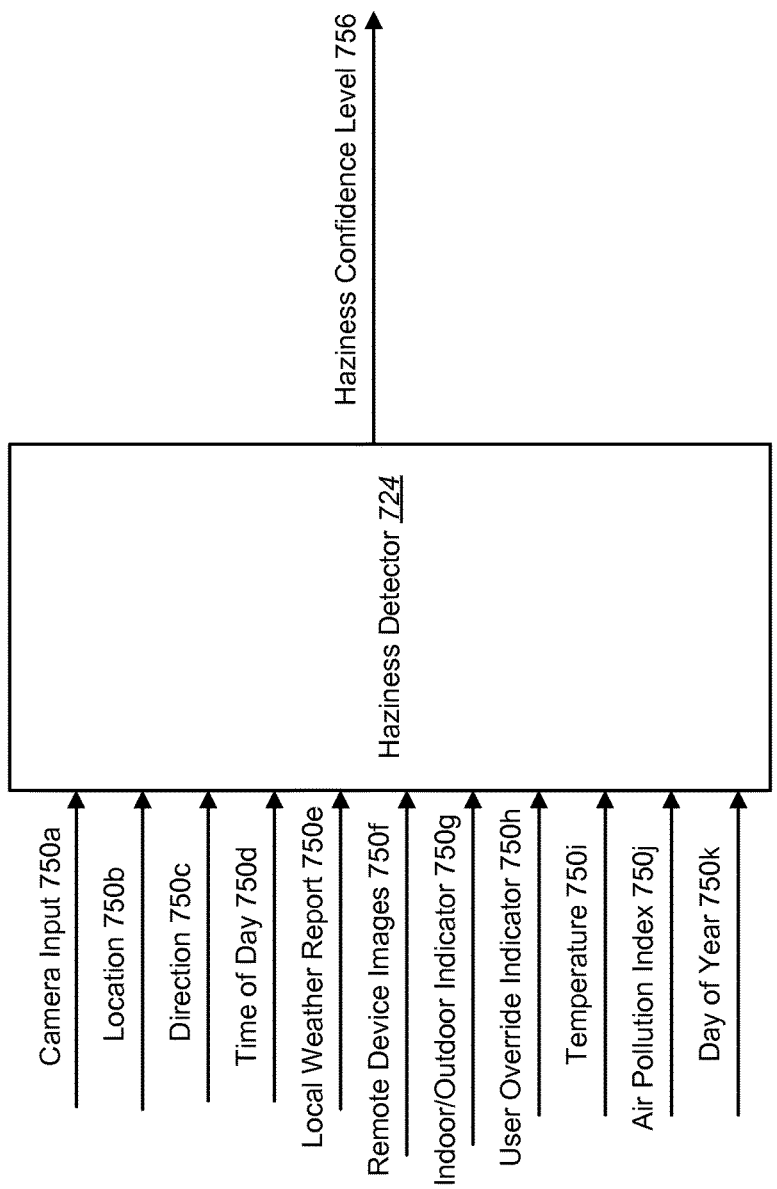
FIG. 7 is a block diagram illustrating another example of a configuration of a haziness detector.

FIG. 7 is a block diagram illustrating another example of a configuration of a haziness detector 724. The haziness detector 724 may receive a camera input 750a and one or more additional types of modality information: location 750b, direction 750c, time of day 750d, local weather report 750e (e.g., forecast), remote device images 750f, an indoor/outdoor indicator 750g, a user override indicator 750h, a temperature 750i, an air pollution index 750j, and/or a day of the year 750k. Based on the camera input 750a and the one or more additional types of modality information 750b-k, the haziness detector 724 may determine a haziness confidence level 756. For example, the haziness detector 724 may utilize the camera input 750a and one or more additional types of modality information 750b-k to directly determine a single haziness confidence level.

Figure 8:
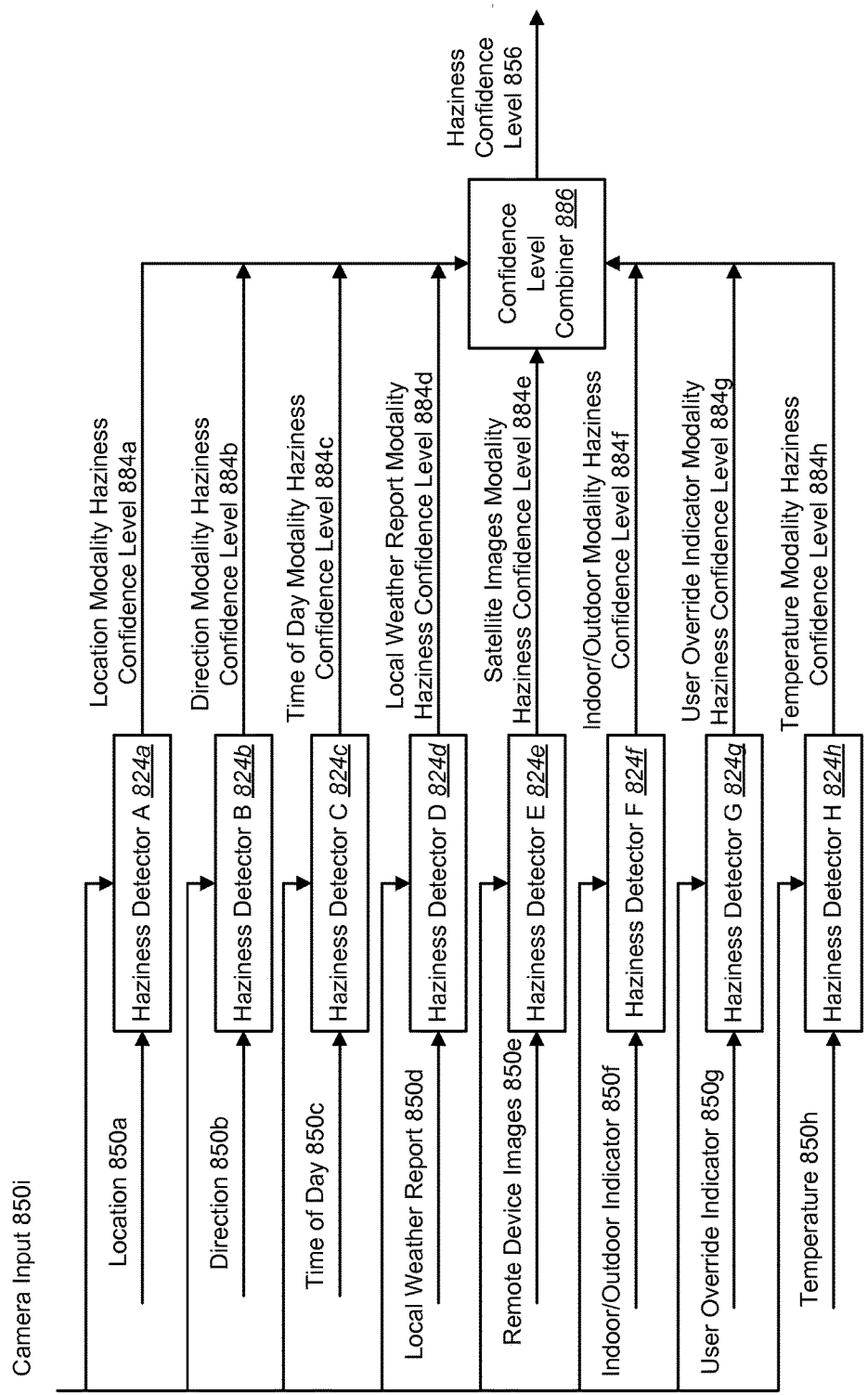
FIG. 8 is a block diagram illustrating an example of a configuration of multiple haziness detectors operating in parallel.

FIG. 8 is a block diagram illustrating an example of a configuration of multiple haziness detectors 824a-h operating in parallel. The haziness detectors 824a-h may be an example of one or more of the haziness detectors 124, 224, 324, 424 described in connection with one or more of FIGS. 1-4. Each haziness detector 824 may receive the camera input 850i and one or more types of modality information 850a-850h. For example, Haziness Detector A 824a may receive the location modality information 850a. The Haziness Detector A 824a may output a location modality haziness confidence level 884a (e.g., a haziness confidence level based on the camera input and the location modality information).

As another example, Haziness Detector B 824b may receive the direction modality information 850b. Haziness Detector B 824b may output a direction modality haziness confidence level 884b.

Haziness Detector C 824c may receive the time of day modality information 850c and may output a time of day modality haziness confidence level 884c. Haziness Detector D 824d may receive the local weather report (e.g., forecast) modality information 850d and may output the local weather forecast modality haziness confidence level 884d.

Haziness Detector E 824e may receive the remote device images modality information 850e and may output a remote device images modality haziness confidence level 884e. Haziness Detector F 824f may receive an indoor/outdoor indicator modality information 850f and may output an indoor/outdoor modality haziness confidence level 884f.

Haziness Detector G 824a may receive user override indicator modality information 850g and may output a user override modality haziness confidence level 884g. Haziness Detector H 824h may receive temperature modality information 850h and may output a temperature modality haziness confidence level 884h.

Each of the obtained modality haziness confidence levels 884a-h may then be combined to obtain an overall haziness confidence level 856. For example, each of the modality haziness confidence levels 884a-h may be provided to a confidence level combiner 886. The confidence level combiner 886 may be implemented in one or more of the electronic devices 102, 202, 302 (e.g., in a processor 104), for example. In some configurations, the confidence level combiner 886 may combine the modality haziness confidence levels 884a-h by averaging the modality haziness confidence levels 884a-h. In some configurations, the confidence level combiner 886 may determine a weighted average of the modality haziness confidence levels 884a-h to produce the haziness confidence level 856. Having multiple haziness detectors 824a-h running in parallel may provide an advantage of reduced computation time in obtaining the haziness confidence level 856.

It should be noted that fewer or more haziness detectors 824 may be implemented. For example, a haziness detector for a day of the year modality information may be implemented. Additionally or alternatively, a haziness detector for an air pollution index may be implemented. The result(s) from one or more of the detectors 824 may be combined as described above.

Figure 9:
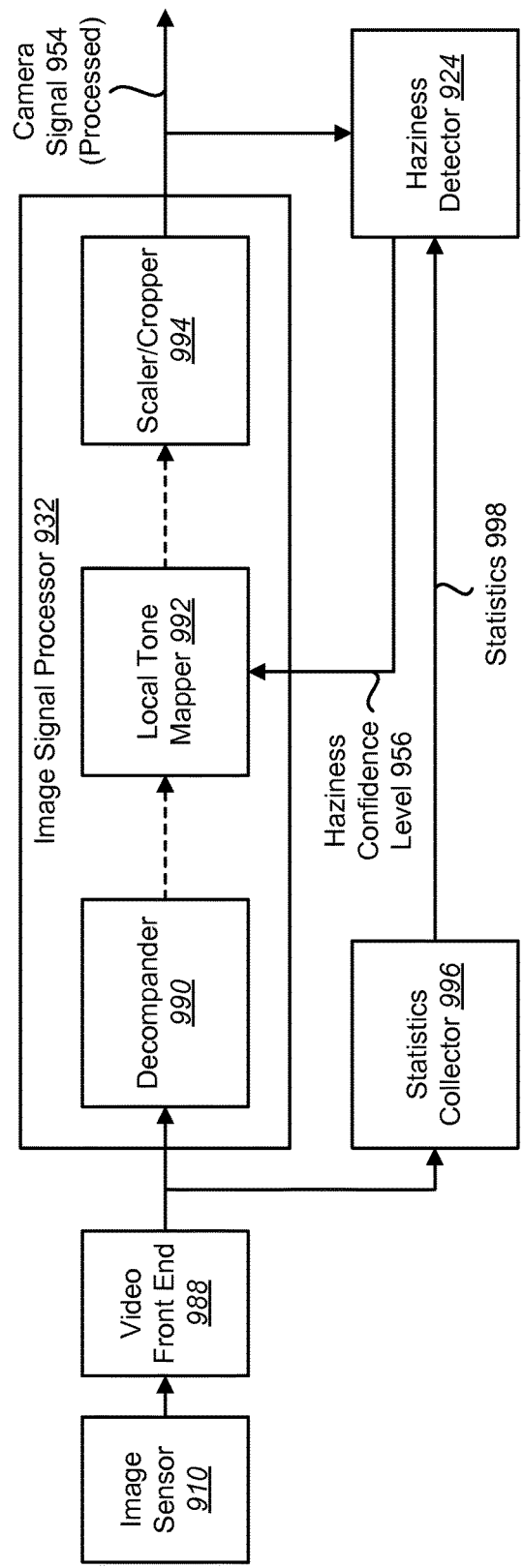
FIG. 9 is a block diagram illustrating one example of one configuration of an image signal processor.

FIG. 9 is a block diagram illustrating one example of one configuration of an image signal processor 932. The image signal processor 932 may be one example of one or more of the image signal processors 132, 332 described in connection with one or more of FIGS. 1 and 3. Some objectives to be met during haziness reduction may include enhancing image processing and/or accuracy of associated applications (e.g., ADAS functionality, object detection, object tracking, object recognition, auto focus, depth mapping, and/or 3D modeling, etc. For example, one or more of the approaches for haziness reduction may achieve consistency during preview frames and between snapshots with no flickering, no obvious artifacts (color, noise, and/or artificial contours), and/or enhancing ADAS image quality and detection accuracy. In some configurations, local tone mapping (LTM) hardware in a camera image signal processor pipeline may be controlled to reduce haziness.

An image sensor 910 may capture image data. The image sensor 910 described in connection with FIG. 9 may be an example of one or more of the image sensors 110, 310 described in connection with one or more of FIGS. 1 and 3. The image data may be provided to an optional video front end (VFE) 988. The video front end 988 may perform one or more pre-processing operations. For example, the video front end 988 may generate an image based on the image sensor output(s). The video front end 988 may provide the pre-processed image data to the image signal processor 932 and to a statistics collector 996.

The image signal processor 932 may include an optional decompander 990, a local tone mapper (LTM) 992, and/or an optional scaler/cropper 994. It should be noted that more or fewer processing elements may be implemented in the image signal processor 932.

The decompander 990 may perform a decompanding operation on the pre-processed image data. It should be noted that the decompander 990 may be included in (e.g., implemented by) the image signal processor 932 and/or the video front end 988.

The local tone mapper 992 may perform local tone mapping on the image data. For example, local tone mapping may include mapping a set of colors to a different set of colors. For instance, a first dynamic range (e.g., a higher dynamic range) of input image data may be mapped to a second dynamic range (e.g., a lower dynamic range). In some configurations, the second dynamic range may correspond to the dynamic range of a display (e.g., display 108). Local tone mapping may be performed in an effort to reduce contrast in an input image into a range that is displayable and to preserve color. In some configurations, the local tone mapper 992 may apply a local tone mapping curve to the image data. In particular, the local tone mapper 992 may boost local contrast (e.g., adjust intensity values of pixels to increase differences between neighboring pixels potentially rendering objects in the image clearer) in high intensity regions of the image data. Additional detail regarding local tone mapping is given in connection with FIG. 10.

The scaler/cropper 994 may scale and/or crop the image data. The image signal processor 932 may accordingly produce a (processed) camera signal 954. The camera signal 954 may be provided to a haziness detector 924.

The haziness detector 924 may be one example of one or more of the haziness detectors 124, 224, 324, 424, 724, 824 described in connection with one or more of FIGS. 1-4 and 7-8. The haziness detector 924 may determine a haziness confidence level 956 as described above. The haziness confidence level 956 may be provided to the local tone mapper 992. The local tone mapper 992 may control (e.g., adjust) the local tone mapping in order to perform haziness reduction. Controlling the local tone mapping may include modifying one or more LTM curves to boost local contrast in high intensity regions. For example, the local tone mapper 992 may increase the depth of an LTM curve for higher haziness confidence levels 956 and/or decrease the depth of the LTM curve for lower haziness confidence levels 956. Examples of LTM curves are provided in connection with FIG. 10.

It should be noted that the statistics collector 996 may collect statistics 998 of the pre-processed image data. The statistics 998 may be provided to the haziness detector 924. In some configurations, the haziness detector 924 may utilize the statistics 998 as an input vector that may be used to train the classifier.

Figure 10:
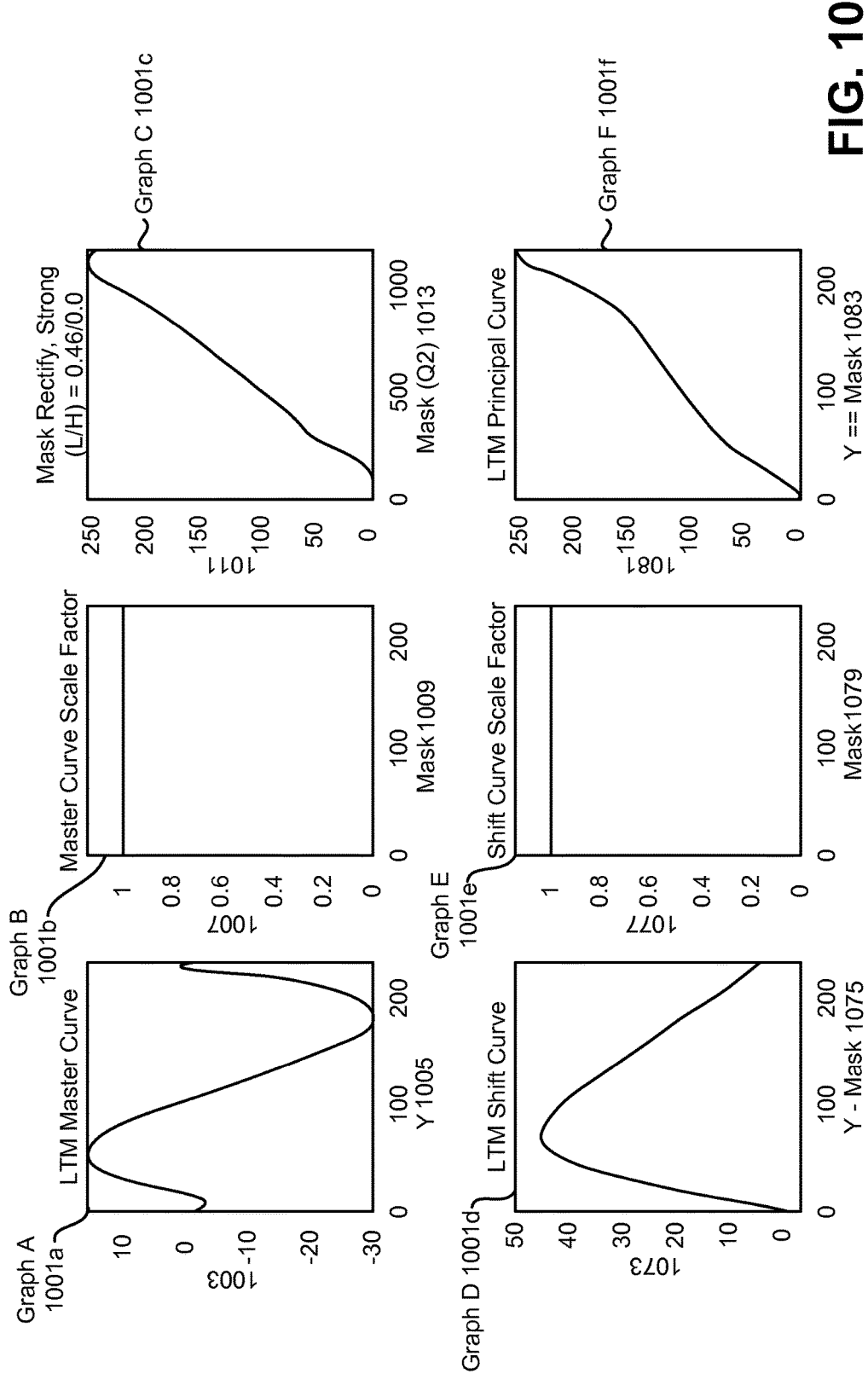
FIG. 10 includes several graphs illustrating various aspects of local tone mapping (LTM) functions.

FIG. 10 includes several graphs 1001*a-f* illustrating various aspects of local tone mapping (LTM) functions (e.g., curves). For example, the graphs 1001*a-f* may relate to input and output gray-scale levels. Input and output gray-scale levels may optionally be quantized with a different number of bits (e.g., 256 or 1024). The respective vertical axes 1003, 1073 of Graph A 1001*a* and Graph D 100*d* may represent adjustment values applied to the illuminance. The respective vertical axes 1007, 1077 of Graph B 1001*b* and Graph E 1001*e* may represent adjustment amounts applied to the illuminance. The horizontal axes 1005, 1009, 1075, 1079 of Graphs A-B 1001*a-b* and D-E 1001*d-e* may represent illuminance values. Graph C 1001*c* and Graph F 1001*f* may represent final mapping curves from input illuminance values (on respective horizontal axes 1013, 1083) to output illuminance values (on respective vertical axes 1011, 1081).

LTM functions may be utilized by an image signal processor 132, 332 (e.g., the local tone mapper 992) to perform haziness reduction, for example. A digital image (e.g., image data from an image sensor, raw camera signal, pre-processed image data, etc.) may be composed of pixels. Each pixel may have an intensity value in one or more channels (e.g., red, green, blue, etc.). The intensity value may have a particular range (from 0-255, for example). For each pixel in an image, an image signal processor 132, 332 (e.g., local tone mapper 992) may adjust the pixel's intensity in one or more of the channels based on intensities of neighboring pixels. Graph A 1001*a* illustrates one example of an LTM master curve. The LTM master curve illustrates adjustments applied to the pixel's intensity (along the vertical axis 1003) for different average intensities of neighboring pixels (along the horizontal axis 1005). As illustrated, image signal processor 132, 332 may increase an intensity of a pixel in a low intensity area and may decrease an intensity of a pixel in a high intensity area. For example, the dip around 200 in the LTM master curves may be used to reduce the intensity level and increase the contrast around the illuminance level of 200. Graph B 1001*b* illustrates one example of a master curve scale factor and Graph C 1001*c* illustrates one example of mask rectification.

Graph D 1001*d* illustrates one example of an LTM shift curve. An LTM shift curve shows how an intensity of a pixel is adjusted (along the vertical axis 1073) based on a difference (along the horizontal axis 1075) between the intensity and an average intensity of neighboring pixels. Graph E 1001*e* illustrates one example of a shift curve scale factor and Graph F 1001*f* illustrates one example of an LTM principle curve.

One or more of an LTM master curve and an LTM shift curve may be controlled based on a haziness confidence level. For example, adjustments to pixel intensities may be increased as a haziness confidence level increases. For instance, reducing haziness may include increasing the depth of one or more LTM curves (as a haziness confidence level increases, for example).

Figure 11:
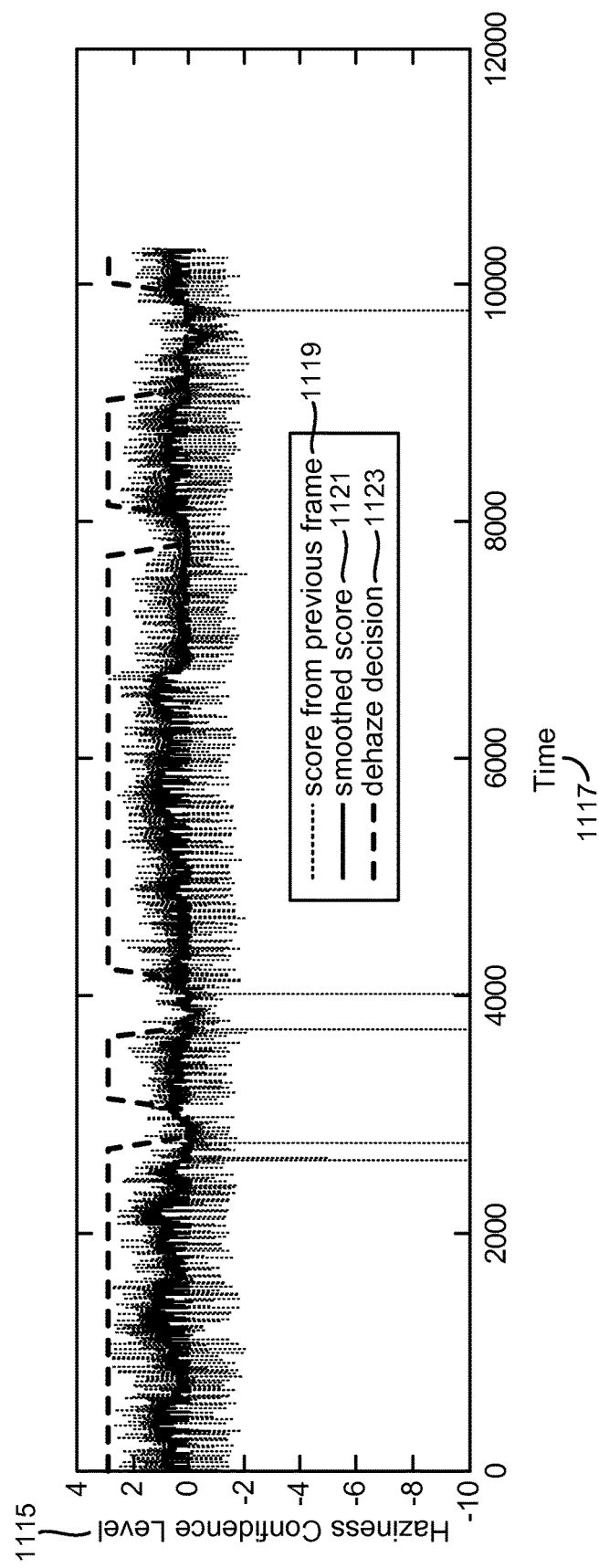
FIG. 11 is a graph illustrating a haziness reduction decision. In particular, the graph illustrates haziness confidence level over time.

FIG. 11 is a graph illustrating a haziness reduction decision. In particular, the graph illustrates a haziness confidence level 1115 over time 1117 (in frames (at 30 frames per second (fps), for example)). Specifically, one plot illustrates a haziness confidence level from a previous frame 1119 and a smoothed haziness confidence level 1121. For example, an electronic device may smooth the haziness confidence level over time 1117. As illustrated in FIG. 11, a haziness reduction decision 1123 may occur when the haziness confidence level 1115 is high enough (e.g., greater than or equal to a haziness confidence threshold). The plots in FIG. 11 may illustrate the haziness reduction decision taken from an ADAS application with resized images.

Figure 12A:
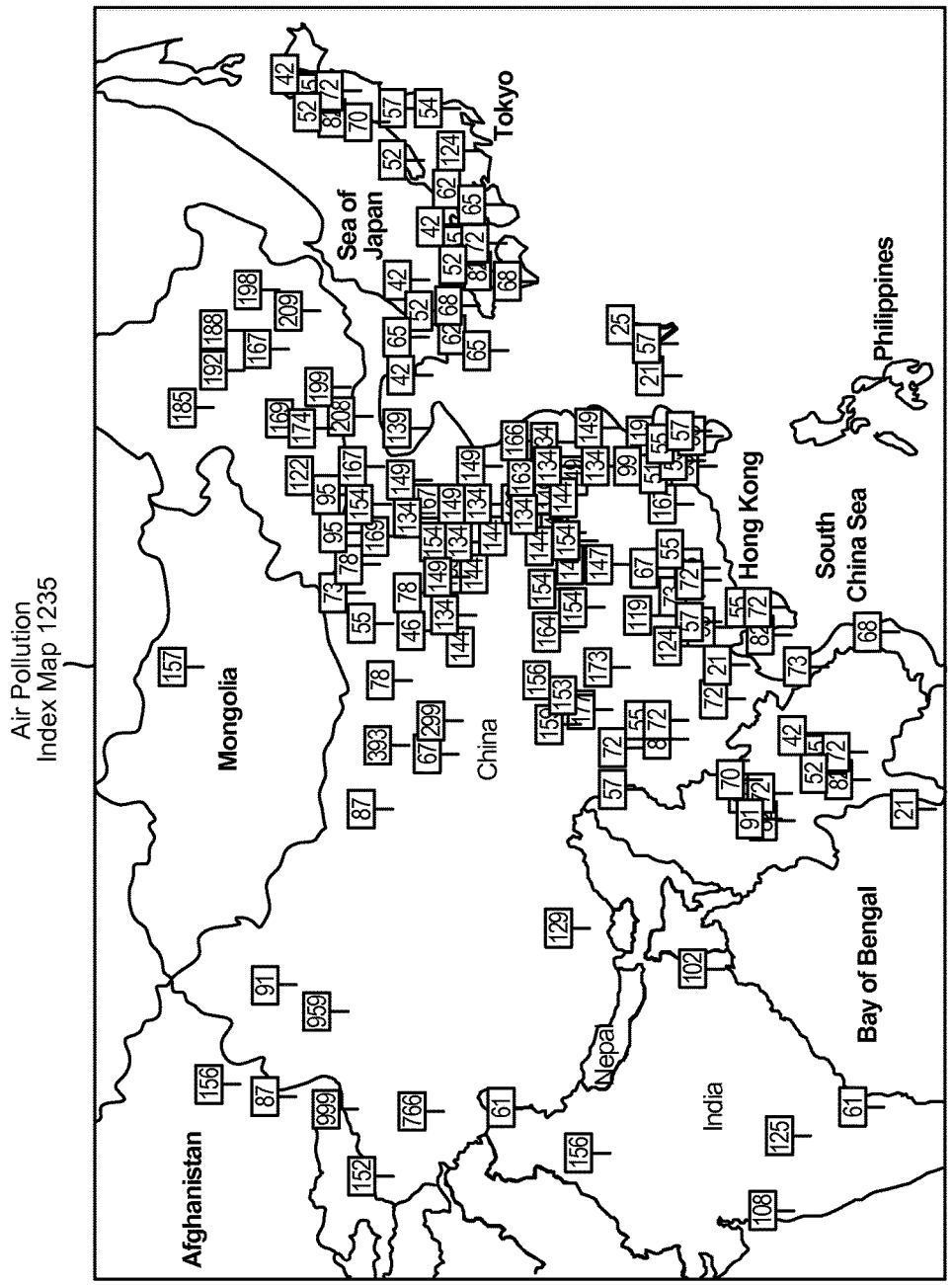
FIG. 12A is an example of an air pollution index map.

FIG. 12A is an example of an air pollution index map 1235. In some configurations, an electronic device (e.g., electronic device 102, 202, 302) may request and/or receive an air pollution index for one or more locations from a remote device (e.g., remote server). For example, an electronic device may request and/or receive an air pollution index for an area in which the electronic device is located. The air pollution index may be one kind of modality information that may be utilized to determine a haziness confidence value as described herein. The air pollution index map 1235 illustrates one example of a map with air pollution indices.

Figure 12B:
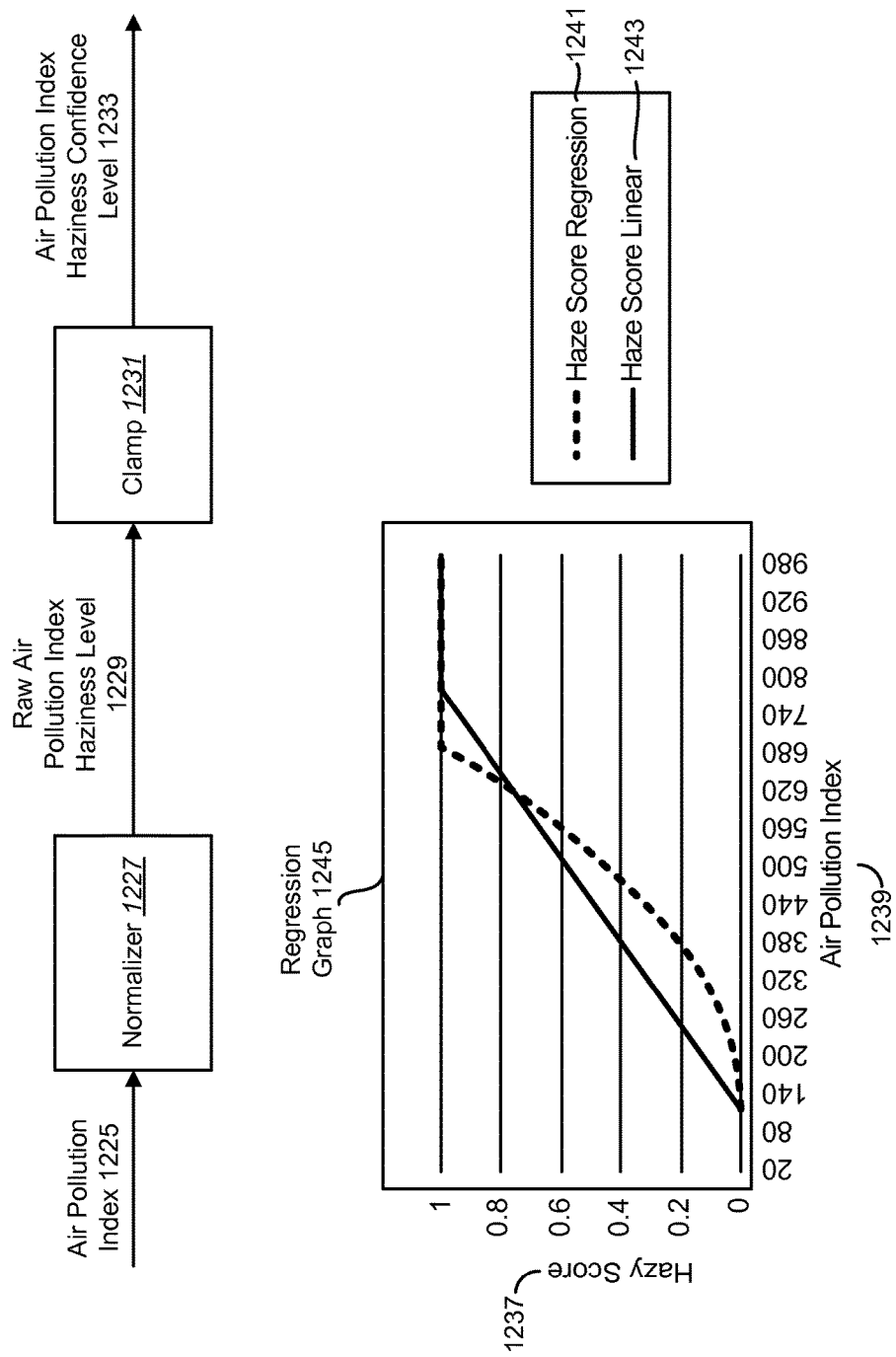
FIG. 12B is a diagram that illustrates approaches for performing haziness detection based on one kind of modality information (air pollution index)

FIG. 12B is a diagram that illustrates approaches for performing haziness detection based on one kind of modality information (air pollution index). For example, the block diagram illustrates one approach for determining the air pollution index haziness confidence level 1233, where the air pollution index haziness confidence level 1233 is a normalized air pollution index. The air pollution index haziness confidence level 1233 may be one example of a modality haziness confidence level as described in connection with FIG. 8.

In this example, the air pollution index 1225 (which may be retrieved from a remote server, for example) may be provided to a normalizer 1227. In particular, the air pollution index map 1235 provides examples of air pollution indices that may be obtained by an electronic device. The normalizer 1227 may normalize the air pollution index 1225 to produce a raw air pollution index haziness level 1229. In some configurations, raw air pollution index haziness level 1229 may be determined in accordance with the following equation:

$$Raw = \frac{AirPollutionIndex - MinPollutionIndexThd}{MaxPollutionIndexThd - MinPollutionIndexThd},$$

where Raw is the raw air pollution index haziness level 1229, AirPollutionIndex is the air pollution index 1225, MinPollutionIndexThd is a minimum air pollution index threshold, and MaxPollutionIndexThd is a maximum air pollution index threshold. In some configurations, the raw air pollution index haziness level 1229 may be provided to a clamp 1231 (function). The clamp 1231 may transform the raw air pollution index haziness level 1229 to within a given range (e.g., [0, 1]). The clamp 1231 may provide the air pollution index haziness confidence level 1233.

Another approach to determining the air pollution index haziness confidence level may be a machine learning approach: using regression to generate a one-dimensional function that links the air pollution index to an air pollution index haziness confidence level (e.g., visual haze score). Data labeling and air pollution indices may be recorded in order to train the regressor. This approach is illustrated in connection with the regression graph 1245. The regression graph 1245 illustrates a haze score 1237 over the air pollution index 1239. In particular, the regression graph 1245 illustrates a haze score regression 1241 and a linear haze score 1243.

Figure 13:
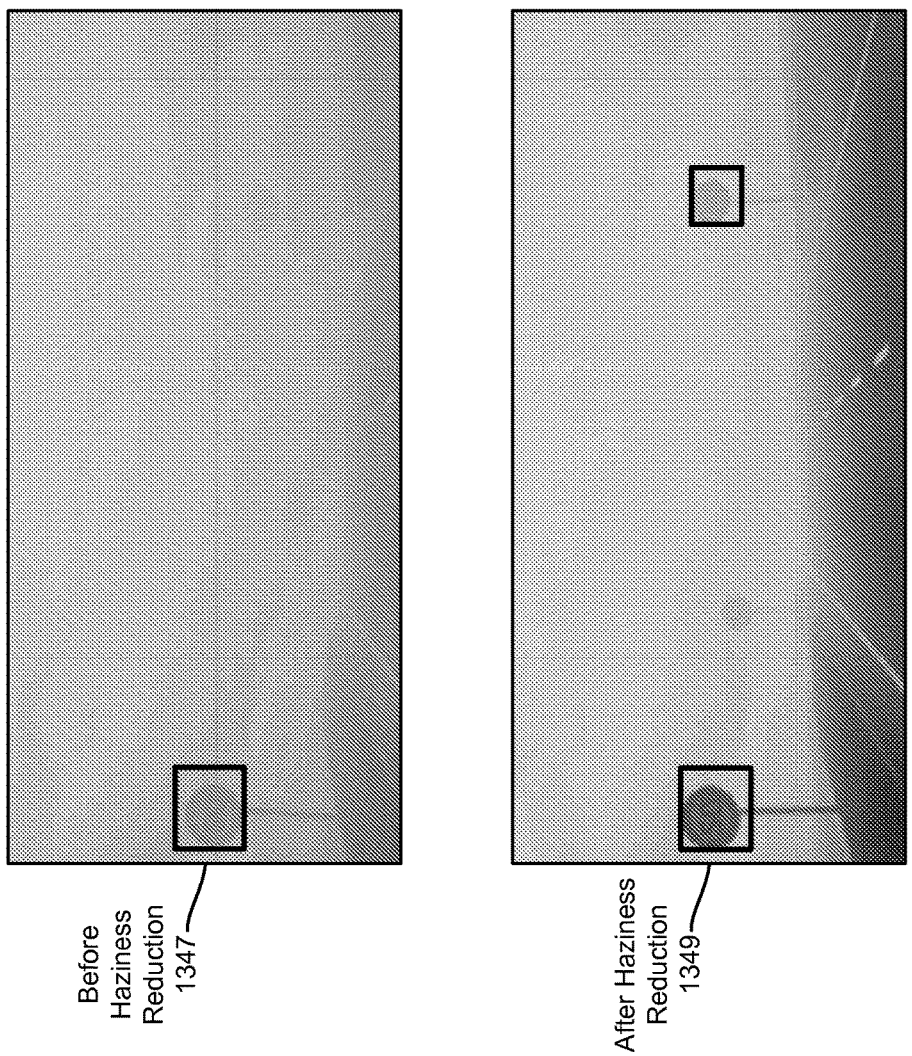
FIG. 13 illustrates examples of images before haziness reduction and after haziness reduction in accordance with the systems and methods disclosed herein.

FIG. 13 illustrates examples of images before haziness reduction 1347 and after haziness reduction 1349 in accordance with the systems and methods disclosed herein. Specifically, the top image is an example of an image before haziness reduction 1347, with a visibility of approximately 50 meters (m). The lower image illustrates an example of an image after haziness reduction 1349, which illustrates a significant improvement in visibility. Some configurations of the systems and methods disclosed herein may be applied to traffic sign and/or lane detection. For example, an automobile may be implemented with the systems and methods disclosed herein. In hazy scenarios, the systems and methods disclosed herein may provide haziness detection and haziness reduction. The de-hazed images may enable an electronic device (e.g., an automobile) to detect and/or track street signs and/or lane stripes with greater accuracy.

Figure 14:
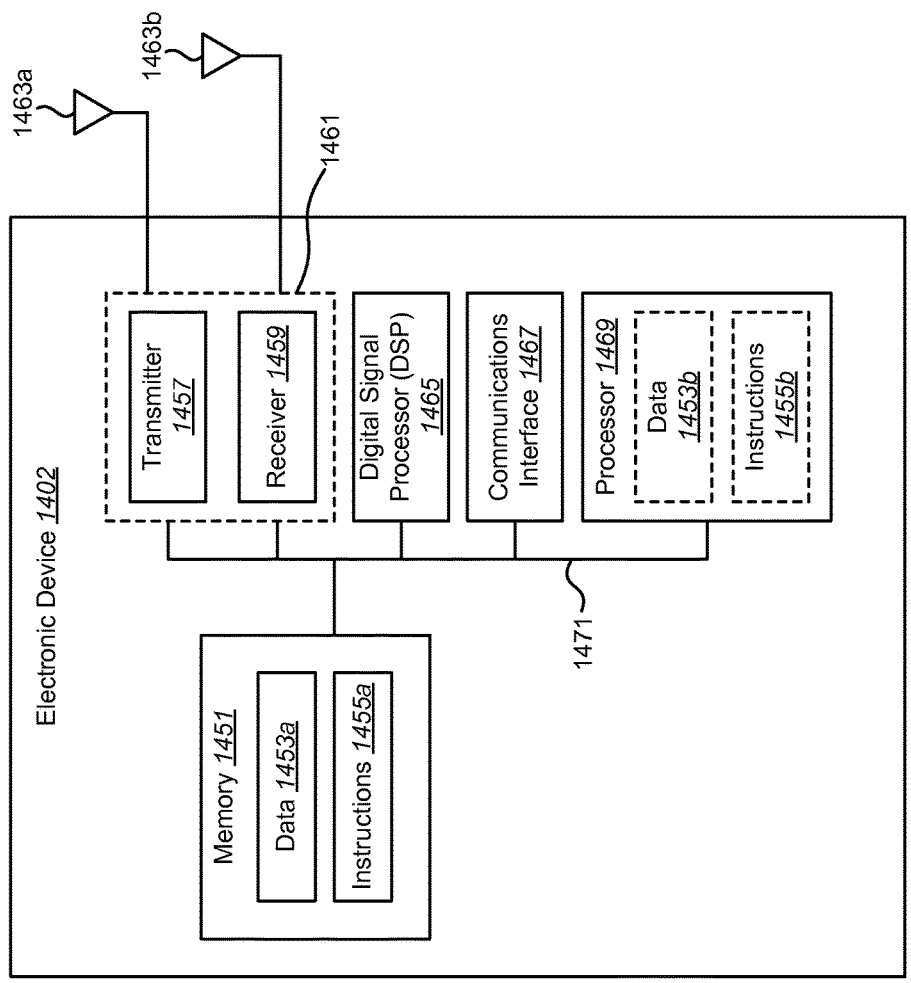
FIG. 14 illustrates certain components that may be included within an electronic device configured to implement various configurations of the systems and methods disclosed herein.

FIG. 14 illustrates certain components that may be included within an electronic device 1402 configured to implement various configurations of the systems and methods disclosed herein. The electronic device 1402 may be an access terminal, a mobile station, a user equipment (UE), a base station, an access point, a broadcast transmitter, a node B, an evolved node B, etc. The electronic device 1402 may be implemented in accordance with one or more of the electronic devices 102, 202, 302 described herein. The electronic device 1402 includes a processor 1469. The processor 1469 may be a general purpose single- or multi-chip microprocessor (e.g., an ARM), a special purpose microprocessor (e.g., a digital signal processor (DSP)), a microcontroller, a programmable gate array, etc. The processor 1469 may be referred to as a central processing unit (CPU). Although just a single processor 1469 is shown in the electronic device 1402, in an alternative configuration, a combination of processors (e.g., an ARM and DSP) could be used.

The electronic device 1402 also includes memory 1451. The memory 1451 may be any electronic component capable of storing electronic information. The memory 1451 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1453a and instructions 1455a may be stored in the memory 1451. The instructions 1455a may be executable by the processor 1469 to implement one or more of the methods 500, 600 disclosed herein. Executing the instructions 1455a may involve the use of the data 1453a that is stored in the memory 1451. When the processor 1469 executes the instructions 1455a, various portions of the instructions 1455b may be loaded onto the processor 1469, and various pieces of data 1453b may be loaded onto the processor 1469.

The electronic device 1402 may also include a transmitter 1457 and a receiver 1459 to allow transmission and reception of signals to and from the electronic device 1402. The transmitter 1457 and receiver 1459 may be collectively referred to as a transceiver 1461. Multiple antennas 1463*a*-*b* may be electrically coupled to the transceiver 1461. The electronic device 1402 may also include (not shown) multiple transmitters, multiple receivers, multiple transceivers and/or additional antennas.

The electronic device 1402 may include a digital signal processor (DSP) 1465. The electronic device 1402 may also include a communications interface 1467. The communications interface 1467 may enable the electronic device/wireless to device 1402 to communicate with one or more other devices and/or users. For example, the communications interface 1467 may include one or more wired and/or wireless interfaces for inter-device communication. In some configurations, the transceiver 1461 may be included in the communications interface 1467. Additionally or alternatively, the communications interface 1467 may include one or more other input/output interfaces (e.g., touch screens, mouse ports, etc.).

The various components of the electronic device 1402 may be coupled together by one or more buses 1471, which may include a power bus, a control signal bus, a status signal bus, a data bus, etc. For the sake of clarity, the various buses are illustrated in FIG. 14 as a bus system 1471.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 5 and 6, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic device, comprising:
a processor configured to:
perform a first feature extraction based on image modality information to produce a first set of one or more extracted image features;
perform a first classification based on the first set of extracted image features and non-image modality information from one or more additional non-image modalities, wherein the non-image modality information indicates information regarding a context of the image modality information;
determine a haziness confidence level based on the first classification; and
perform haziness reduction on a captured image based on the haziness confidence level, wherein a greater haziness reduction is performed for a first haziness confidence level than for a second haziness confidence level that is lower than the first haziness confidence level.

2. The electronic device of claim 1, wherein the haziness reduction comprises adjusting one or more of the group consisting of an auto white balance, an auto focus, auto exposure, a color, a sharpness, and a local tone mapping curve.

3. The electronic device of claim 1, wherein the processor is further configured to perform at least one non-image processing action.

4. The electronic device of claim 1, wherein the processor is further configured to determine the haziness confidence level based on a two-stage classification.

5. The electronic device of claim 4, wherein the processor is further configured to:
determine that the first classification indicates that haziness is detected;
perform a second feature extraction based on the image modality information and one or more of the additional non-image modalities to produce a second set of one or more extracted image features; and
perform a second classification based on the second set of extracted image features and one or more of the additional non-image modalities, wherein the haziness confidence value is determined based on the first classification and the second classification.

6. The electronic device of claim 5, wherein the first set of extracted image features comprises one or more of the group consisting of a dark channel feature, a gradient of intensity feature, and a blurriness/sharpness feature.

7. The electronic device of claim 5, wherein the second set of extracted image features comprises one or more of the group consisting of a dark channel feature, a magnitude of gradient feature, a phase of gradient feature, and a gradient spatial information feature.

8. The electronic device of claim 1, wherein the processor is further configured to implement a detector that is configured to obtain the haziness confidence level based on one or more of the modalities.

9. The electronic device of claim 1, wherein the processor is further configured to implement multiple detectors, wherein each detector is configured to obtain a modality haziness confidence level based on one or more of the modalities, and wherein the processor is configured to combine the modality haziness confidence levels to form the haziness confidence level.

10. The electronic device of claim 1, wherein the non-image modality information includes one or more of the group consisting of location modality information, direction modality information, time of day modality information, local weather report modality information, remote device images modality information, an indoor/outdoor indicator, user override indicator, and temperature modality information.

11. A method performed by an electronic device, comprising:
performing a first feature extraction based on image modality information to produce a first set of one or more extracted image features;
performing a first classification based on the first set of extracted image features and non-image modality information from one or more additional non image modalities, wherein the non-image modality information indicates information regarding a context of the image modality information;
determining a haziness confidence level based on the first classification; and
performing haziness reduction on a captured image based on the haziness confidence level, wherein a greater haziness reduction is performed for a first haziness confidence level than for a second haziness confidence level that is lower than the first haziness confidence level.

12. The method of claim 11, wherein the performing haziness reduction comprises adjusting one or more of the group consisting of an auto white balance, an auto focus, an auto exposure, a color, a sharpness, and a local tone mapping curve.

13. The method of claim 11, wherein performing the action comprises performing at least one non-image processing action.

14. The method of claim 11, wherein determining the haziness confidence level is based on a two-stage classification.

15. The method of claim 14, wherein the two-stage classification comprises:
determining that the first classification indicates that haziness is detected;
performing a second feature extraction based on the image modality information and one or more of the additional non-image modalities to produce a second set of one or more extracted image features; and
performing a second classification based on the second set of extracted image features and one or more of the additional non-image modalities, wherein the haziness confidence value is determined based on the first classification and the second classification.

16. The method of claim 15, wherein the first set of extracted image features comprises one or more of the group consisting of a dark channel feature, a gradient of intensity feature, and a blurriness/sharpness feature.

17. The method of claim 15, wherein the second set of extracted image features comprises one or more of the group consisting of a dark channel feature, a magnitude of gradient feature, a phase of gradient feature, and a gradient spatial information feature.

18. The method of claim 11, wherein the haziness confidence level is obtained by a detector, wherein the detector obtains the haziness confidence level based on one or more of the modalities.

19. The method of claim 11, wherein the haziness confidence level is obtained by multiple detectors, wherein each detector obtains a modality haziness confidence level based on one or more of the modalities, and wherein the modality haziness confidence levels are combined to form the haziness confidence level.

20. The method of claim 11, wherein the non-image modality information includes one or more of the group consisting of location modality information, direction modality information, time of day modality information, local weather report modality information, remote device images modality information, an indoor/outdoor indicator, user override indicator, and temperature modality information.

21. An apparatus, comprising:
  means for performing a first feature extraction based on image modality information to produce a first set of one or more extracted image features;
  means for performing a first classification based on the first set of extracted image features and non-image modality information from one or more additional non-image modalities, wherein the non-image modality information indicates information regarding a context of the image modality information;
  means for determining a haziness confidence level based on the first classification; and
  means for performing haziness reduction on a captured image based on the haziness confidence level, wherein a greater haziness reduction is performed for a first haziness confidence level than for a second haziness confidence level that is lower than the first haziness confidence level.

22. The apparatus of claim 21, further comprising means for performing at least one non-image processing action.

23. The apparatus of claim 21, wherein the means for determining the haziness confidence level is based on a two-stage classification.

24. A computer-program product, comprising a non-transitory computer-readable medium having instructions thereon, the instructions comprising:
  code for causing an electronic device to perform a first feature extraction based on image modality information to produce a first set of one or more extracted image features;
  code for causing the electronic device to perform a first classification based on the first set of extracted image features and non-image modality information from one or more additional non-image modalities, wherein the non-image modality information indicates information regarding a context of the image modality information;
  code for causing the electronic device to determine a haziness confidence level based on the first classification; and
  code for causing the electronic device to perform haziness reduction on a captured image based on the haziness confidence level, wherein a greater haziness reduction is performed or a first haziness confidence level than for a second haziness confidence level that is lower than the first haziness confidence level.

25. The computer-program product of claim 24, further comprising code for causing the electronic device to perform at least one non-image processing action.

26. The computer-program product of claim 24, wherein the code for causing the electronic device to determine the haziness confidence level is based on a two-stage classification.

* * * * *